United States Patent
Handerek

(10) Patent No.: US 9,574,970 B2
(45) Date of Patent: Feb. 21, 2017

(54) DISTRIBUTED OPTICAL FIBRE SENSOR

(71) Applicant: Fotech Solutions Limited, London (GB)

(72) Inventor: Vincent Handerek, Essex (GB)

(73) Assignee: Fotech Solutions Limited, London (GB)

(*) Notice: Subject to any disclaimer, the term of this patent is extended or adjusted under 35 U.S.C. 154(b) by 0 days.

(21) Appl. No.: 15/044,588

(22) Filed: Feb. 16, 2016

(65) Prior Publication Data
US 2016/0161296 A1   Jun. 9, 2016

Related U.S. Application Data

(63) Continuation of application No. 13/884,017, filed as application No. PCT/GB2011/052183 on Nov. 9, 2011, now Pat. No. 9,304,017.

(30) Foreign Application Priority Data

Nov. 11, 2010 (GB) .................................. 1019117.9

(51) Int. Cl.
| | |
|---|---|
| *G01D 5/353* | (2006.01) |
| *G01M 11/00* | (2006.01) |
| *G01L 11/02* | (2006.01) |
| *G01H 9/00* | (2006.01) |

(52) U.S. Cl.
CPC ...... *G01M 11/3145* (2013.01); *G01D 5/35303* (2013.01); *G01D 5/35306* (2013.01); *G01D 5/35358* (2013.01); *G01H 9/004* (2013.01); *G01L 11/025* (2013.01); *G01M 11/3127* (2013.01)

(58) Field of Classification Search
CPC ............ G01D 5/35306; G01D 5/35358; G01D 5/35303; G01M 11/3127; G01M 11/3145; G01L 11/025; G01H 9/004
USPC ....... 356/73.1, 511, 477, 479, 460, 465, 483
See application file for complete search history.

(56) References Cited

U.S. PATENT DOCUMENTS

| | | | |
|---|---|---|---|
| 4,572,949 A | 2/1986 | Bowers et al. | |
| 4,707,136 A * | 11/1987 | Kim | G01C 19/726 356/464 |
| 4,997,277 A | 3/1991 | Horiguchi et al. | |

(Continued)

FOREIGN PATENT DOCUMENTS

| | | |
|---|---|---|
| EP | 1096273 A2 | 5/2001 |
| EP | 1568981 A2 | 8/2005 |

(Continued)

OTHER PUBLICATIONS

Dakin, "Multiplexed and Distributed Optical Fibre Sensor Systems," J. Phys. E: Sci. Instrum; 20 (1987), pp. 954-967.

(Continued)

*Primary Examiner* — Sang Nguyen
(74) *Attorney, Agent, or Firm* — K&L Gates LLP

(57) ABSTRACT

There is described a distributed optical fiber sensor for detecting one or more physical parameters indicative of an environmental influence on a sensor optical fiber, as a function of position along the sensor fiber. The sensor uses probe light pulses of different wavelengths. At least some of the probe light pulses may also be of different pulse lengths. The relative phase bias between interferometric signals in backscattered probe light of different wavelength pulses may also be controlled.

35 Claims, 11 Drawing Sheets

(56) References Cited

U.S. PATENT DOCUMENTS

| | | | |
|---|---|---|---|
| 5,000,568 A * | 3/1991 | Trutna, Jr. | G01M 11/3118 250/227.15 |
| 5,194,847 A | 3/1993 | Taylor et al. | |
| 5,567,933 A * | 10/1996 | Robinson | G01M 11/3109 250/227.15 |
| 5,621,517 A | 4/1997 | Jezwinski et al. | |
| 5,627,637 A | 5/1997 | Kapteyn | |
| 5,696,863 A | 12/1997 | Kleinerman | |
| 5,757,487 A | 5/1998 | Kersey | |
| 5,777,727 A | 7/1998 | Sato et al. | |
| 5,841,131 A | 11/1998 | Schroeder et al. | |
| 6,630,658 B1 | 10/2003 | Bohnert et al. | |
| 6,668,105 B2 | 12/2003 | Chen et al. | |
| 7,800,755 B1 | 9/2010 | Poirier et al. | |
| 7,872,736 B2 | 1/2011 | Rogers et al. | |
| 7,940,389 B2 | 5/2011 | Rogers et al. | |
| 8,520,197 B2 | 8/2013 | Handerek | |
| 2002/0028034 A1 | 3/2002 | Chen et al. | |
| 2002/0168146 A1 | 11/2002 | Watanabe | |
| 2002/0176647 A1 | 11/2002 | Spirin et al. | |
| 2004/0246582 A1 | 12/2004 | Du et al. | |
| 2005/0231728 A1 | 10/2005 | Wang et al. | |
| 2006/0132793 A1 * | 6/2006 | Ogawa | G01M 11/331 356/484 |
| 2006/0146337 A1 | 7/2006 | Hartog | |
| 2006/0256344 A1 * | 11/2006 | Sikora | H04B 10/2587 356/477 |
| 2008/0100828 A1 | 5/2008 | Cyr et al. | |
| 2008/0180681 A1 * | 7/2008 | Digonnet | G01C 19/722 356/477 |
| 2008/0278711 A1 * | 11/2008 | Sikora | G01M 11/3181 356/73.1 |
| 2008/0297772 A1 | 12/2008 | Rogers et al. | |
| 2009/0103928 A1 * | 4/2009 | Healey | H04B 10/548 398/140 |
| 2009/0304322 A1 | 12/2009 | Davies et al. | |
| 2010/0073667 A1 | 3/2010 | Cyr et al. | |
| 2010/0290734 A1 * | 11/2010 | Kaplan | G01M 5/0091 385/12 |
| 2010/0302548 A1 * | 12/2010 | Digonnet | G01C 19/721 356/465 |
| 2011/0255077 A1 * | 10/2011 | Rogers | G01L 1/242 356/73.1 |
| 2011/0320147 A1 | 12/2011 | Brady et al. | |
| 2012/0127459 A1 * | 5/2012 | Handerek | G01D 5/353 356/73.1 |
| 2012/0144642 A1 * | 6/2012 | Steinkraus | G01N 29/12 29/407.01 |

FOREIGN PATENT DOCUMENTS

| | | |
|---|---|---|
| EP | 1912050 A1 | 4/2008 |
| GB | 2243908 A | 11/1991 |
| GB | 2250593 A | 6/1992 |
| GB | 2442746 A | 4/2008 |
| GB | 2469012 A | 9/2010 |
| WO | 98/30881 A1 | 7/1998 |
| WO | 02/21170 A1 | 3/2002 |
| WO | 02/095349 A1 | 11/2002 |
| WO | 2006/048647 A2 | 5/2006 |
| WO | 2008/056143 A1 | 5/2008 |
| WO | 2010/009007 A1 | 1/2010 |
| WO | 2010/073002 A1 | 7/2010 |

OTHER PUBLICATIONS

Dorrio et al., "Phase-Evaluation Methods in Whole-Field Optical Measurement Techniques," Meas. Sci. Technol., 10 (1999) pp. R33-R55.

Kersey et al., "Dual-Wavelength Approach to Interferometric Sensing," SPIE vol. 798 Fiber Optic Sensors II, (1987), pp. 176-181.

Posey et al., "Strain Sensing Based on Coherent Rayleigh Scattering in an Optical Fibre," Electronics Letters, vol. 36, No. 20, Sep. 28, 2000, 2 pages.

Wyant, "Testing Aspherics Using Two-Wavelength Holography," Applied Optics, vol. 10, No. 9, Sep. 1971, pp. 2113-2118.

Search Report under Section 17(5) for United Kingdom Patent Application No. GB1019117.9; Date of Search Jan. 31, 2011; mailed Feb. 1, 2011, 6 pages.

Further Search Report under Section 17 for United Kingdom Patent Application No. GB1019117.9; Date of Search Aug. 19, 2011; mailed unknown; 2 pages.

International Search Report for PCT/GB2011/052183; Search completed Jun. 27, 2012; mailed Jul. 5, 2012; 6 pages.

Written Opinion of the Searching Authority for PCT/GB2011/052183; 12 pages.

* cited by examiner

DISTRIBUTED OPTICAL FIBRE SENSOR

CROSS-REFERENCE TO RELATED APPLICATIONS

This application is a continuation of U.S. patent application No. 13/884,017, filed on May 8, 2013, which is a national phase application under 35 U.S.C. 371 of International Application No. PCT/GB2011/052183, filed on Nov. 9, 2011, which claims priority to and the benefit of U.K. Patent Application No. 1019117.9, filed on Nov. 11, 2010, the entire disclosures of each of which are incorporated by reference herein.

The present invention relates to distributed optical fibre sensors, in which one or more physical parameters are sensed as a function of position along a sensing optical fibre from the properties of probe light backscattered within the sensing fibre. In particular, but not exclusively, the invention relates to optical time domain reflectometry (OTDR) sensors for use in sensing vibration, and such sensors which use phase sensitive OTDR techniques such as through the detection of coherent Rayleigh noise, or other interrerometric techniques.

INTRODUCTION

Distributed optical fibre sensing is a well known approach to providing information about environmental conditions surrounding a sensing optical fibre. Fully-distributed sensing in principle provides spatially resolved information from every point along the fibre. Variables that can be sensed include temperature, static strain, pressure, and vibration.

One such technique detects variations in refractive index, induced by a physical forcing such as vibration, in the coherent Rayleigh noise profile of light backscattered within a sensing optical fibre interrogated by an optical source of limited bandwidth. Such Rayleigh noise profiles arise from interference between the many components of the backscattered light originating from different points along a portion of the sensing optical fibre illuminated by the optical source. Such techniques are described, for example, in WO2008/056143.

It would be desirable to address problems and limitations of the related prior art.

SUMMARY OF THE INVENTION

Accordingly, the invention provides a distributed optical fibre sensor for determining at least one parameter, typically a physical parameter, from properties of probe light backscattered within the sensing fibre, the sensor comprising: a probe light source arranged to launch probe light pulses into the sensing fibre, the probe light pulses including groups each of two or more probe light pulses having different optical wavelengths to each other; a detector arranged to detect probe light backscattered in said sensing fibre, including separately detecting light of each of said different wavelengths; and an analyser arranged to determine said parameter as a function of position along the sensing fibre from at least some of said detected backscattered probe light, or from the detected backscattered probe light of at least some of the pulses of the group.

In particular, the parameter may be a parameter of the environment around the sensing fibre, such as static pressure, temperature, vibration, or strain on the fibre exerted by the environment, and to which the fibre is responsive.

Such apparatus provides a number of benefits, depending on how the probe light pulses are controlled, detected and analysed. For example, an important performance feature of some distributed optical fibre sensors, such as vibrational sensors, is the maximum frequency of detection or response. In optical fibre distributed sensing systems where the interrogation of the sensing fibre is arranged to provide spatial mapping in the time domain, the maximum frequency of response is limited by the round-trip time required for light to travel at least once between the two ends of the sensing fibre. For very long sensing fibres, this limitation can become troublesome.

The backscattered light from each pulse of a group, and therefore of each different wavelength, may be detected using a separate photodetector, such as a separate photodiode. Particular embodiments may use three, four, or more different optical wavelengths in a group of pulses, and may use a corresponding number of photodetectors.

The pulses of each group may be launched such that at least backscattered light from all the pulses of each group coexists within the sensing fibre, and the detector may then both separately and simultaneously detect light of each of said different wavelengths.

Accordingly, the probe light source may be arranged to interleave launching of the probe light pulses of different wavelengths, and the analyser may be arranged to construct, for a plurality of positions along the sensing fibre, time series of said physical parameter by interleaving data derived from the detected backscatter of probe light for each of said different wavelengths.

Using this technique, multiple probe light pulses can be launched and the corresponding backscattered light from each pulse separately detected within the time frame in which only a single probe light pulse of a single wavelength can be used. An acoustic sensor can therefore be provided with an enhanced acoustic range extending to higher frequencies than a corresponding sensor using a single probe wavelength.

The apparatus may be arranged, for example, to launch said probe light pulses such that interference signals from each wavelength can be detected in the backscattered light, to detect said interference signals in the backscattered light of each optical wavelength, and to determine said parameter as a function of position along the sensing fibre from said detected interference signals.

The intensity of light reflected back toward the illuminated end of the sensing fibre in various types of distributed fibre optic sensors, and in particular sensors using coherent Rayleigh noise or other interferometric techniques, is not intrinsically a linear function of the instantaneous amplitude of the physical parameter to be detected. Rather, the response characteristics for a linear change in the local forcing, such as a vibration-induced strain of the sensing fibre, is periodic and of variable sign and scale factor. This occurs because of the interferometric nature of the optical response. The optical response of the backscattered light to changing strain is governed by a proportional change in relative phase imbalance between parts of a probe light pulse reflected from different positions along the fibre. The net result of the changing phase on the sum of all of the backscattered components is typically to generate a sinusoidal variation of backscattered intensity as the relative phase is changed linearly. Moreover, since the starting point of the intensity change may be at any point within the sinusoidal response, a given fractional change in vibrational strain can generate either a positive or negative fractional change in intensity, and with a scale factor that can vary between zero and some maximum value that depends on the interferometric fringe visibility within the optical system. Since the lower limit of vibrational strain that can be detected by the system is also limited by system noise arising from various sources, the dynamic range of the response of the system is constrained to lie within a certain range of vibration amplitude, and within an even more restricted range if a linear response is desired. A linear response is often desirable.

Accordingly, the probe light source may be arranged to launch some or all of the probe light pulses of a group with different pulse durations. For these purposes, the pulses of a group need not have different wavelengths, for example if two or more of the pulses are launched at sufficient spacing that they can be separately detected when of the same wavelength. The magnitude of the phase imbalance experienced by a probe light pulse for a particular physical forcing, and therefore the scaling of the response characteristics of the sensor, is dependent upon the length of the probe light pulse. By launching probe light pulses of different durations, a range of response characteristics can be achieved at the same time. In particular, the pulses of different duration may be launched within a time frame so as to coexist within the fibre, or for some applications much closer together, for example so as to overlap, or spaced so as not to coexist within the fibre.

One application of this technique is for the analyser to be arranged to compare between data derived from the detected backscatter of the pulses of different pulse durations in the group. The analyser can then also be arranged to derive a measure of non-linearity of response characteristic for each pulse duration. The sensor may then be arranged to adjust durations of launched probe light pulses dependent upon the results of said comparison. Using such a scheme, the sensor can adaptively provide a more linear response across particular sections or the whole of the sensing fibre, for example by selecting a pulse duration for use in determining the physical parameter which gives the optimum signal to noise ratio without excessive non-linearity.

In another application of this technique the analyser is adapted to weight the use of data derived from the detected backscatter of the pulses to preferentially select for data from a subset of the different pulse durations. For example, data from pulse durations where non-linearity is evident may be rejected or be used with a low weighting. Data from pulse durations with a level of non-linearity below a certain threshold may be preferentially or exclusively used. Data with the maximum pulse length duration where the level of non-linearity is still below the threshold may be preferentially or exclusively used, in order to select for the data with the strongest response characteristics without being unduly compromised by non-linearity.

Data from different pulse lengths or durations may be selected for different positions or regions along the sensing fibre, even from within pulses of the same group. In this way, the dynamic range of the sensor can be optimised for local conditions such as areas with high levels and low levels of noise.

Generally, the local phase imbalance at any point along the sensing fibre is highly sensitive to the wavelength of the probe light pulse. However, it is observed that by careful control of the probe light wavelength, the phase biases in the interferometric backscatter signals arising from pulses of different wavelengths can be aligned or brought into a particular spacing, and that these relative phase biases between the different wavelengths can be maintained along much or all of the sensing fibre. As a result, the relationship between the response characteristics for pulses of different wavelengths at any point along the sensing fibre can be controlled. The relative phase bias can be observed from backscattered probe pulse light, and then can be adjusted accordingly by fine adjustment of one or more of the probe light wavelengths. In particular, such techniques apply where the sensor is an interferometric sensor, and determines said physical parameter from detected interference properties of the backscattered probe light at each probe light wavelength.

Accordingly, the sensor may be arranged to control the relative phase bias or biases between interferometric backscatter signals from respective pulses in each group, for example to maintain predetermined spacings between the phase biases of different wavelengths. For example, setting the relative phase bias between the interferometric backscatter signals from two or more pulses in a group to approximately zero or $\pi$ radians (parallel or antiparallel), can be used to obtain similar response characteristics between the pulses. If the relative phase bias for two particular wavelengths is set to a predetermined or controlled value of approximately $\pi/2$ radians (orthogonal), the signals from the two wavelengths can be added in quadrature, or added vectorially based on the relative phase bias, to derive a signal with a response characteristic which is close to constant along the sensing fibre, or at least which varies much less than the response characteristic from any single pulse.

To control the relative phase bias, the sensor may compare between data derived from the detected backscatter of the pulses of different wavelengths in the group, and adjust one or more of said plurality of different wavelengths dependent upon results of said comparison, so as to control the relative phase bias.

In order to assist in detection of the phase bias, the sensor may further comprise a phase bias calibrator arranged to exert a predetermined forcing on a reference section of optical fibre into which the probe light pulses are launched. The reference section may, in particular, be a section of the sensing fibre itself. The sensor may then be arranged to compare between data derived from the detected backscatter of the pulses of different wavelength in the group, which occurs in said reference section of optical fibre. If the forcing is at a particular acoustic frequency then the relative phase bias or biases of the interferometric backscatter from pulses in the group within the reference section of fibre will be evident from the phases or waveforms of the acoustic frequency signals detected from the backscattered light in respect of each pulse wavelength.

It will be understood from the above that not all of the pulses of each group need be used to determine the parameter to be sensed by the sensor. For example, if multiple pulse durations are being used, only pulses with a satisfactory linearity of response might be used for determining the parameter.

The invention also provides methods corresponding to the various apparatus features discussed above, for example of operating a distributed optical fibre sensor to determine at least one parameter as a function of position along a sensing fibre from properties of probe light backscattered within the sensing fibre, the method comprising:

launching probe light pulses into the sensing fibre, the probe light pulses including successive groups each of two or more probe light pulses having different optical wavelengths and/or different pulse lengths to each other;

detecting probe light backscattered in said sensing fibre, including separately detecting light of each of said different wavelengths and/or pulse lengths; and determining said parameter as a function of position along the sensing fibre from said detected backscattered probe light.

Some of the operational principles of the invention can be illustrated with reference to an ideal two-path interferometer. This case represents a considerable simplification compared to practical cases, but will serve to explain the basic principles with the best clarity. The relative phase, $\Delta\phi_b$, of light emerging from an undisturbed, two-path interferometer illuminated by a coherent source of fixed wavelength $\lambda$ is given by:

$$\Delta\phi_b = 2\pi n_e d/\lambda \quad (1)$$

where $n_e$ is the effective refractive index of the propagation medium and d is the physical distance of the path imbalance in the interferometer. When the interferometer is undisturbed, this phase is commonly referred to as the 'phase bias delay' of the interferometer. Small disturbances of the interferometer will lead to corresponding disturbances of the phase imbalance around this phase bias value. The output optical intensity of an ideal interferometer with perfectly coherent illumination is proportional to one plus the cosine of the instantaneous phase imbalance. In the context of the invention described here, the location and mean path imbalance of the interferometer are set by parameters of the optical reflectometry system. In the case of optical time domain reflectometry, the location of the interferometer is defined by the time delay after launching an optical interrogation pulse into a sensing fibre, and the mean path imbalance is related to the physical length of the portion of the fibre that is illuminated at any instant in time. However, the actual bias phase for each sensing location along the fibre will typically be very large compared to $2\pi$ radians, and the exact value of the phase bias within a range of $2\pi$ will be unpredictable, since the fibre properties and state of background strain are prone to vary with position.

Embodiments of the invention are arranged to interrogate the sensing fibre with probe pulses of more than one optical wavelength, with the reflectometric parameters adjusted differently for each wavelength. The invention may be applied to optical time domain reflectometry, though alternative reflectometric sensing techniques could also be used and could also have been chosen for illustrations.

BRIEF SUMMARY OF THE DRAWINGS

Embodiments of the invention will now be described, by way of example only, with reference to the accompanying drawings of which.

DETAILED DESCRIPTION OF EMBODIMENTS

Figure 1:
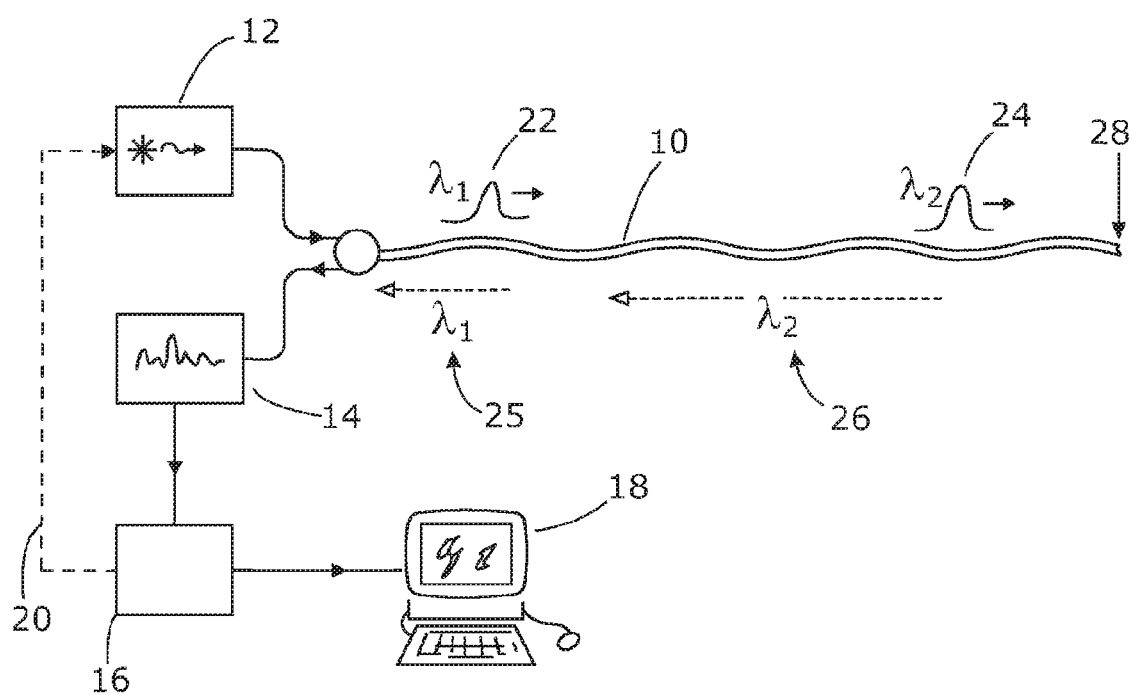
FIG. 1 illustrates a distributed optical fibre sensor using probe light pulses of more than one wavelength.

Referring to FIG. 1 there is illustrated a distributed optical fibre sensor suitable for sensing one or more physical parameters as a function of position along part or all of the sensing optical fibre 10, using time domain reflectometry. The sensor includes the sensing fibre 10, a probe light source 12 for launching probe light pulses into the sensing fibre, a detector 14 for detecting probe light which has been backscattered within the sensing fibre 10, and an analyser 16 for processing data received from the detector.

The analyser 16 outputs analysis results such as a determination of the one or more physical parameters, and in FIG. 1 this output is passed to a computer display 18, although various other types of output mechanism may be used. The analyser 16 also uses data derived from the detected backscatter to provide control signals 20 to the probe light source 12. A variety of control signals may be provided, some of which are discussed below, including signals controlling the duration of probe light pulses and signals controlling the wavelengths of the probe light pulses. In alternative embodiments, the control functions may be implemented separately to the analyser 16, for example in a controller element. The skilled person will appreciate that the optical, electronic and data processing functionality of the sensor can be implemented and distributed across different functional or physical units in various ways according to convenience and implementation objectives.

The probe light source 12 is arranged to launch into the sensing fibre groups of two or more probe light pulses 22, 24. Each pulse of a group is of a different optical wavelength, shown in FIG. 1 as $\lambda_1$ and $\lambda_2$. Depending on the mode of operation of the sensor, the probe light pulses of a group may be launched either together or at different times, so they may propagate together or spaced from each other along the sensing fibre. There may be two, three, four or more pulses, and therefore different wavelengths, in a group.

Each probe light pulse is backscattered as it propagates along the sensing fibre, as illustrated in FIG. 1 by backscattered light portions 25, 26 of wavelengths $\lambda_1$ and $\lambda_2$ respectively.

Backscattered probe light is received at the detector 14. The detector is arranged to receive and detect light of the different optical wavelengths $\lambda_1$ and $\lambda_2$ separately. Noting that even when probe light pulses of a group are launched in a widely spaced configuration as shown in FIG. 1, and at up to an equivalent distance spacing of twice the length of the sensing fibre 10 (to allow for round-trip paths), backscattered light from all the pulses of a group will overlap at the detector to some extent, the detector may also be arranged to detect light of the different wavelengths simultaneously. The detector records time series data of intensity, power or other characteristics of the received light of each different frequency, and this data is passed to the analyser 16.

The probe light source 12 can be implemented using one or more lasers. If two or more separate lasers are used, for example to generate probe light pulses of two or more different wavelengths for a group of probe light pulses, then at least some of the optical components such as optical amplifiers and filters for conditioning the probe light pulses and directing them to the sensing fibre 10 may be shared. The detector 14 may similarly use separate photodetector components, such as PIN diodes, for each different wavelength of a group of probe light pulses, but may share other optical components such as optical amplifiers and filters before the different wavelengths are demultiplexed to the photodetector components. If the probe light pulses of different wavelengths are launched with sufficient spacing that backscattered light of the different wavelengths does not overlap significantly at the detector, then a single photodetector element may be used for all wavelengths. A more detailed description of a suitable arrangement for putting into effect the optical and electronic aspects of the sensor of FIG. 1 is discussed below in connection with FIG. 10. Aspects of data processing and control which can be implemented are illustrated in others of the figures.

Typical wavelengths for the pulses may be around 1528 to 1562 nm. Pulse shapes may be rectangular, or of more complex shape, for example using the double peak form discussed in WO 2006/048647. Pulse lengths may typically be in the range from around 1 ns to 1000 ns. Pulse group repetition rates may typically be between about 1 kHz and 1 MHz. Pulse peak powers may typically be between about 0.1 and 1 W. Advantageously, the wavelengths of all the pulses in a group may be closely spaced, for example within a wavelength band of 1 nanometre. The optical source bandwidth may be between about 1 kHz and 10 GHz, although coherence at the lower end of this scale will be dominated by the frequency transform of the pulse shape. The sensing fibre is preferably of a single mode type.

In FIGS. 2A to 2H the sensor of FIG. 1 is illustrated in use with several different probe light pulse launching schemes, each representing use of a different group of probe light pulses. In each figure, the sensing fibre 10 is shown by a solid line, with the distal end 28 of the sensing fibre marked in FIG. 2A, followed by a broken line 29 illustrating the fullest length of the return path for backscattered light along the sensing fibre 10 to the detector, but for clarity of illustration extending without reversal of direction. Probe light pulses shown alongside, or in FIG. 2A beyond the left hand end of the broken line 29 no longer exist, having already reached the end 28 of the sensing fibre 10, but their position in each figure is illustrative of launch time relative to other probe light pulses shown.

Figure 2A:
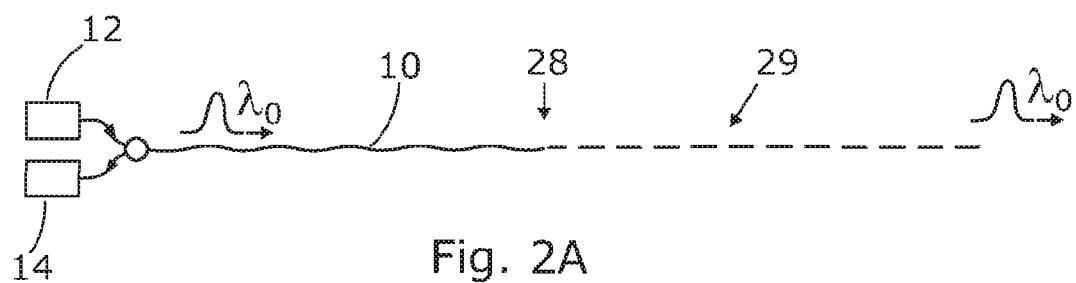
FIGS. 2A to 2H show some ways in which probe light pulses of FIG. 1 may be launched relative to each other.

FIG. 2A shows a probe light pulse launch scheme commonly found in prior art distributed optical fibre sensors. Each pulse is of the same optical wavelength $\lambda_0$, and one pulse follows another at sufficient time delay that backscatter from a previous pulse all arrives at the detector 14 before the next pulse is launched. This avoids weak backscatter from a previous pulse at the distal end of the sensing fibre from mixing with strong backscatter from a subsequent pulse newly launched into the sensing fibre, which would make interpretation of the mixed backscatter from the previous pulse impossible to use, and would increase noise in the backscatter from the newly launched pulse.

Figure 2B:
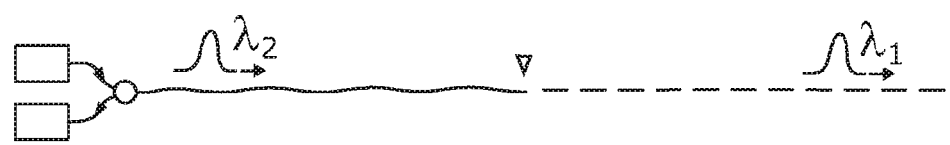
Figure 2C:
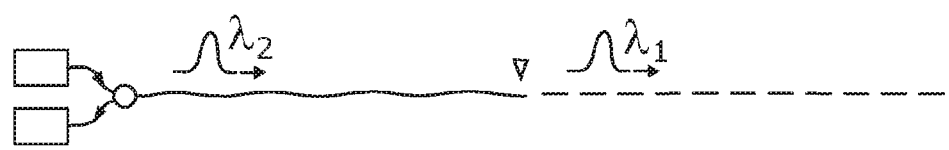
Figure 2D:
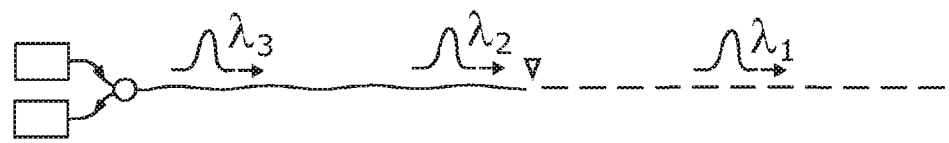

In FIGS. 2B, 2C and 2D, two or more pulses of a group are launched at different times so that they propagate along the sensing fibre in a spaced configuration. Unlike the arrangement of FIG. 2A, the last pulse of each group in these figures is launched before backscattered light from the first pulse of the group finishes arriving at the detector, so that backscattered light from all the pulses in the group coexists in the sensing fibre at some point in time. Whereas in FIG. 2B the pulse $\lambda_2$ is launched when nearly all of the backscatter of pulse $\lambda_1$ has returned to the detector, in FIGS. 2C and 2D the groups of $\lambda_1$ and $\lambda_2$ pulses, or $\lambda_1$, $\lambda_2$ and $\lambda_3$ pulses may be repeated to form a series of regular and evenly spaced probe light pulses. Repetition of a group of probe light pulses as shown in FIG. 2B, 2C or 2D also provides interleaving of probe light pulses of the different wavelengths, which can be used to increase the rate at which the sensor interrogates the sensing fibre 10.

Figure 2E:
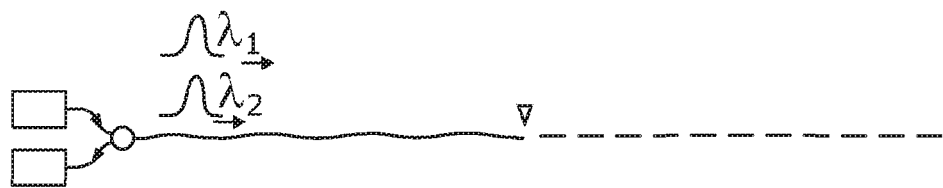
Figure 2F:
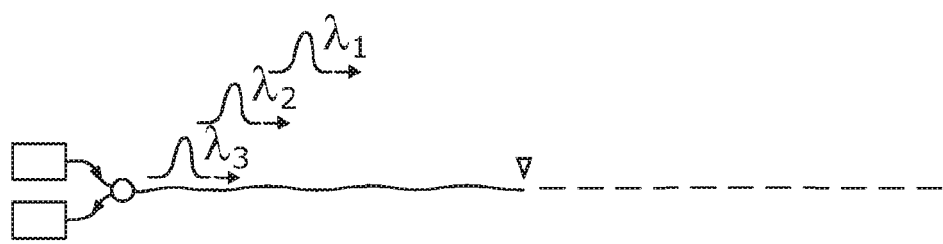

In FIGS. 2E and 2F the pulses of each group are launched at the same or different times, but at least such that the last pulse of a group is launched before the first pulse reaches the end 28 of the sensing fibre. In this way, all the probe light pulses of a group coexist in the sensing fibre at some point in time. FIG. 2E illustrates a group with two pulses launched at the same time, overlapping in physical extent, or at least close together. In FIG. 2F a group with three pulses is launched with a spacing which is much smaller than the length of the sensor fibre, for example with a total spacing of less than 30% of the length of the sensing fibre is shown. Depending on the application, different constraints may be applied as to how close together pulses of a group should be launched.

Figure 2G:
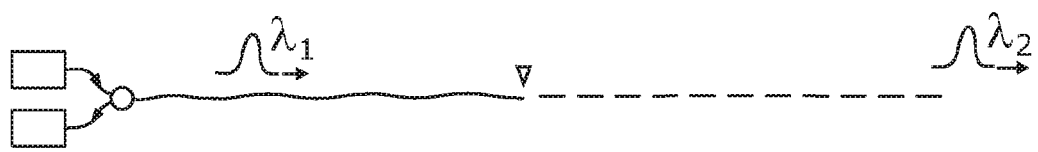
Figure 2H:
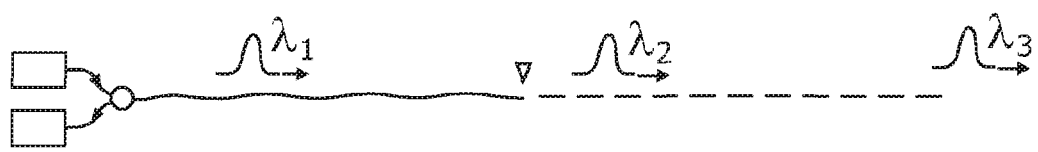

In FIG. 2G the pulses of each group are sufficiently spaced that no backscattered light from an earlier pulse remains in the fibre when a later pulse is launched. In FIG. 2H, backscattered light from at least one, but not all earlier pulses of a group remains in the fibre when a later pulse is launched.

The sensor discussed above can be used to implement a number of different functionalities, separately or in various combinations, using groups of probe light pulses of different optical wavelengths such as those illustrated in FIGS. 2B to 2H.

The probe light pulse repetition rate and therefore the interrogation rate of the sensing fibre 10 in the sensor system of FIG. 1, when using probe light pulses of a single wavelength as illustrated in FIG. 2A, is limited by the propagation delay for probe light backscattered at the distal end of the sensor fibre to return to the launch end of the sensing fibre 10. Launching probe light pulses at a rate where the backscattered light of successive probe light pulses overlaps at the detector at best reduces the quality of the sensor output, for small overlaps prevents detection of useable backscatter signal from the distal end of the sensing fibre, and for significant overlap renders the sensor largely inoperable.

To increase the interrogation rate, or for a vibration sensor sampling the acoustic frequency range, beyond the maximum available from the Nyquist limit set by the pulse repetition rate of probe light pulses for which backscatter does not overlap at the detector, multiple probe light pulses each of a different optical wavelength can be used, for example as described above in connection with FIG. 2B to 2D. In this way, backscattered light from two or more probe light pulses can be detected simultaneously. Preferably the different optical wavelengths are chosen so that they can be multiplexed together so as to share the majority of the optical transmission and reception paths of the sensor, to minimise complexity and cost of the sensor, while also allowing the different wavelengths to be separately received by different photodetector components.

If two different wavelengths are used then the probe light pulses of the two different wavelengths can be alternated in the launching scheme. To maximise the interrogation rate each probe light pulse of alternating wavelength can be launched into the sensing fibre at about the same time as or as soon as possible after a probe light pulse of the other wavelength has reached the distal end 28 of the sensing fibre 10. In this way, probe pulses of one wavelength are launched at times approximately midway between those of the other wavelength, thus doubling the interrogation rate of the sensing fibre. If the sensor is being used to detect acoustic vibrations then this scheme can double the acoustic bandwidth or frequency range compared to the case where a single optical wavelength is used.

The interrogation rate can be extended further by launching probe light pulses of more than two different wavelengths in a group of such pulses, again with the condition that backscattered probe light for successive probe light pulses of any particular wavelength does not overlap at the detector. The interrogation rate can thus be increased in proportion to the number of different wavelengths used.

Figure 3:
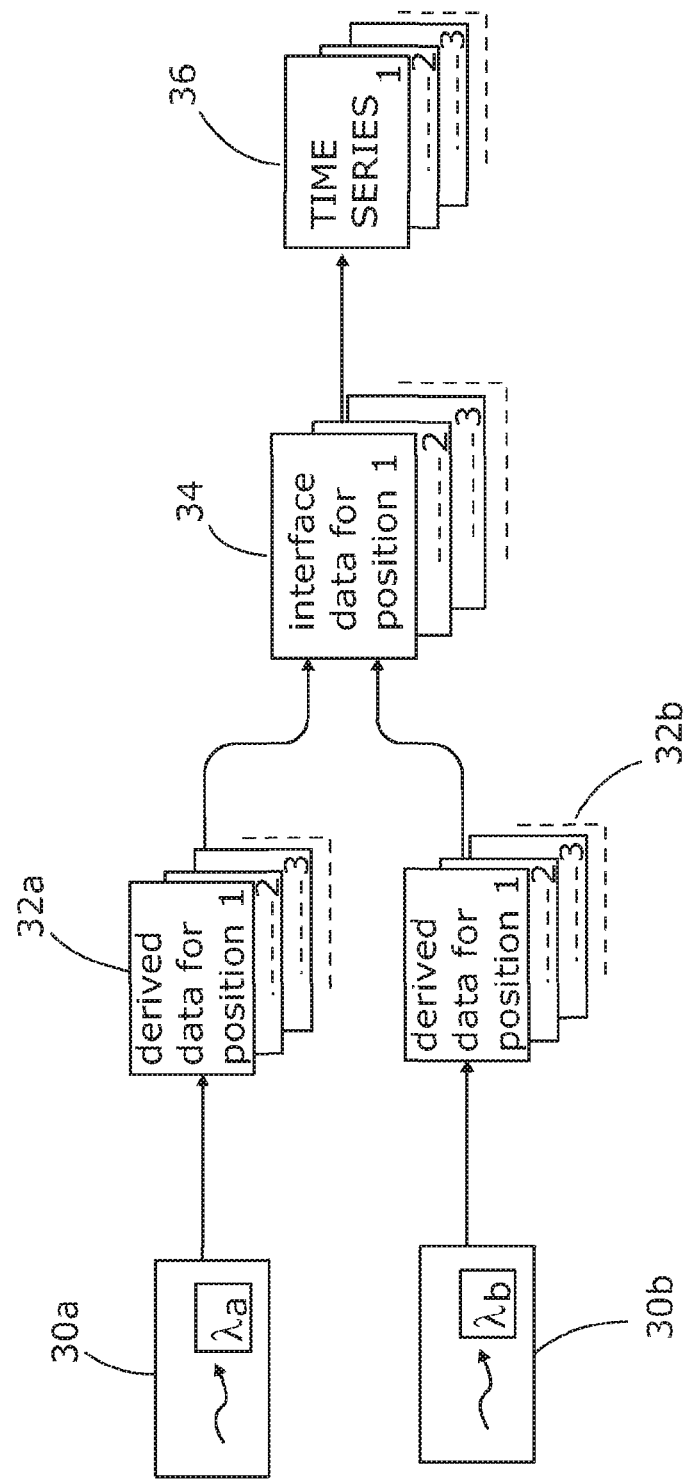
FIG. 3 illustrates a method for enhancing the detection rate of the sensor of FIG. 1 using interleaving.

FIG. 3 illustrates a scheme for deriving higher interrogation rate or sampling rate data, for example a higher acoustic bandwidth, from detected backscatter of interleaved probe light pulses of different wavelengths. Steps 30*a* and 30*b* represent the simultaneous detection of backscattered light at wavelengths at $\lambda_a$ and $\lambda_b$ respectively. Signals from these detection steps are used in steps 32*a* and 32*b* to derive data relating to the detected backscatter of probe light of each respective wavelength at a plurality of positions along the sensing fibre, these positions being denoted by the box label numerals (1, 2, 3...). For each of a plurality of positions or nominal locations along the sensing fibre, the data from the two wavelengths is time-interlaced at step 34, according to the order of the launch of the respective probe light pulses into the sensing fibre, to generate time series of the data 36.

The sensor may be operated, for example, using phase-sensitive optical time domain reflectometry (OTDR) in which probe light pulses are used which are each sufficiently coherent that the detected backscatter signal is dominated by self-interference between different parts of the same pulse. Such techniques are discussed, for example, in WO2008/056143. The resulting Coherent Rayleigh backscatter therefore leads to a temporal speckle pattern of interference fringes at the detectors. The signals resulting from the detection steps may then be a time series of intensity of the detected temporal speckle patterns. In order to sense vibration as a function of position along the sensing fibre, the data relating to the backscatter may be a measure of change over time of the temporal speckle pattern corresponding to a particular sensing fibre position, such as a simple difference between successive samples corresponding to the same fibre position.

Using such techniques, vibration is sensed through the induced rapid small changes in strain and therefore refractive index of the sensing fibre 10. The signal resulting from a single probe light pulse being backscattered to the detector appears as a quasi-random oscillatory signal of essentially static shape. From pulse to pulse the static shape remains unchanged if the strain conditions and therefore refractive index are unchanged, but the shape changes to a lesser or greater extent as the sensing fibre is subjected to vibrationally induced strains of a correspondingly smaller or larger magnitude. The detected optical signal may be referred to as coherent Rayleigh noise, although for this type of reflectometry the "noise" contains the signal of importance.

A notable feature of this reflectometry technique, and similar techniques based on interferometry, is that the intensity, or changes in intensity, of a repeated sampling of the detected optical signal mapping to a particular position or segment of the sensing fibre, is not intrinsically a linear function of the local forcing such as strain and its effect on refractive index at that fibre position. Rather, the response characteristics in the sampled signal to an increasing or decreasing local physical forcing is periodic and of variable sign and scale factor. This occurs because of the interferometric nature of the optical response.

The net result of the changing phase on the sum of all of the backscattered components is typically to generate a sinusoidal variation in intensity of the detected backscatter as the relative phase is changed linearly. Moreover, since the starting point of the intensity change may be any point within the sinusoidal response, a given fractional change in vibrationally induced strain can generate either a positive or negative fractional change in detected optical intensity, and with a scale factor that can vary between zero and some maximum value that depends on the interferometric fringe visibility within the optical system. Since the lower limit of strain that can be detected by the sensor is also limited by system noise arising from various sources, the dynamic range of the response of the sensor is constrained to lie within a certain range of strain amplitude, and within an even more restricted range if linear response characteristics are desired. Linear response characteristics are often desirable.

Figure 4A:
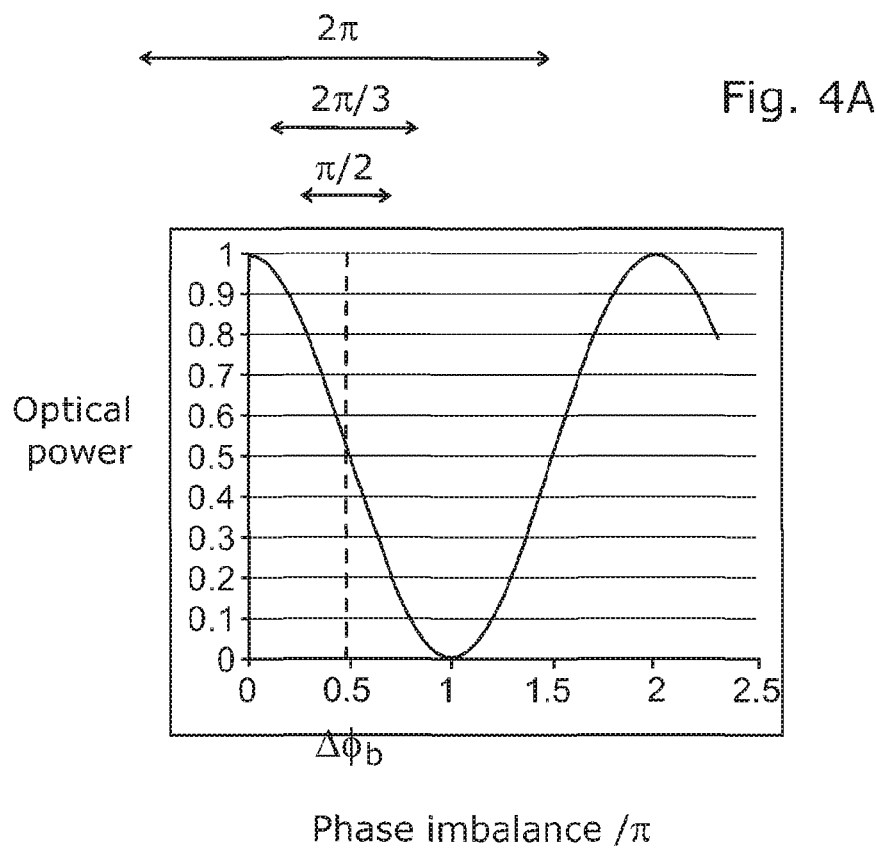
FIGS. 4A and 4B illustrate aspects of phase imbalance and response characteristics in an interferometer analogous to the sensor of claim 1.
Figure 4B:
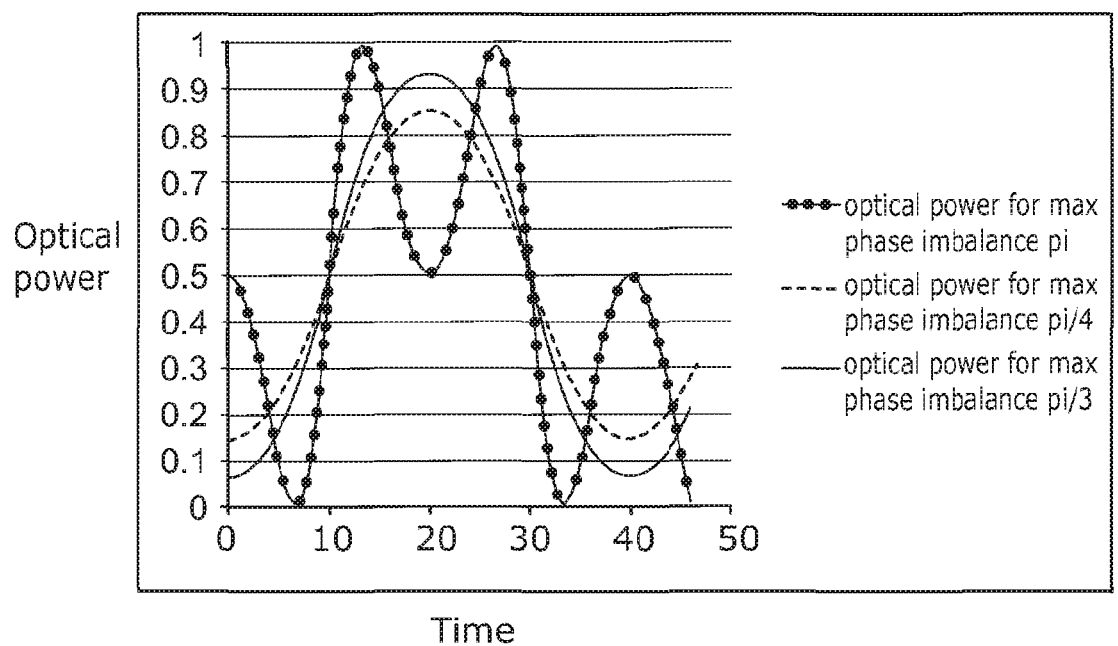

To illustrate this issue of non-linearity, for example when phase disturbances significantly greater than $\pi/2$ radians are experienced at a single sample point in the sensor fibre, FIG. 4A shows the relationship between phase imbalance and output power from an ideal two-path interferometer. In the figure, the horizontal arrows above the graph indicate possible extents of variation in phase imbalance as the sensing fibre is influenced by weaker or stronger changes in strain, for example due to vibration. Variations with peak to peak amplitudes of $\pi/2$, $2\pi/3$ and $2\pi$ are shown around a phase bias of $\pi/2$ radians. Response characteristics, as corresponding oscillatory variations of output power for each of these phase excursions, are shown in FIG. 4B. If the time axis is taken to be in milliseconds then these responses may correspond to vibrational signals at about 25 Hz. For the two smaller phase variations, the output power variations are similar, confirming that the interferometer is operating with a quasi-linear transfer function between phase and power. However, for the largest phase variation, gross distortion of the response characteristics, with a strong component at twice the driving frequency, is evident.

To address the issue of linearity or non-linearity of response characteristics of the sensor to a physical parameter to be measured, the sensor of FIG. 1 may be operated by launching two or more probe light pulses of different pulse lengths, i.e. different physical lengths within the sensing fibre 10, and different lengths in terms of pulse duration from a laser source. If desired, some or all of the pulses of different pulse length may also be of different wavelength so that backscattered light from such pulses can be detected simultaneously. The interferometric path length imbalance for a probe light pulse is dependent upon the pulse length, so that reducing the relative length of one probe light pulse has the effect of reducing the relative interferometric path imbalance for that pulse. If the detected waveforms for the backscattered light for both pulse lengths are similar, as is found between the $\pi/3$ and $\pi/4$ waveforms in FIG. 4B, then linearity of the sensor response characteristic is confirmed. If the detected waveforms for the backscattered light for both pulse lengths are rather different, as is found between the $\pi$ and $\pi/3$ waveforms in FIG. 4B, then non-linearity of the sensor response characteristics, and in particular of the longer length pulses, is confirmed. A measure of the non-linearity of the response characteristics of at least one or other of the two pulse lengths, typically the longer one, can be made by comparing the two signal waveforms, for example to determine a measure of differences in shape.

If the measure of non-linearity exceeds a threshold then adjustments can be made to the pulse lengths of the probe light pulses of one or both pulses of the group in order to seek a more linear response characteristic.

Figure 5:
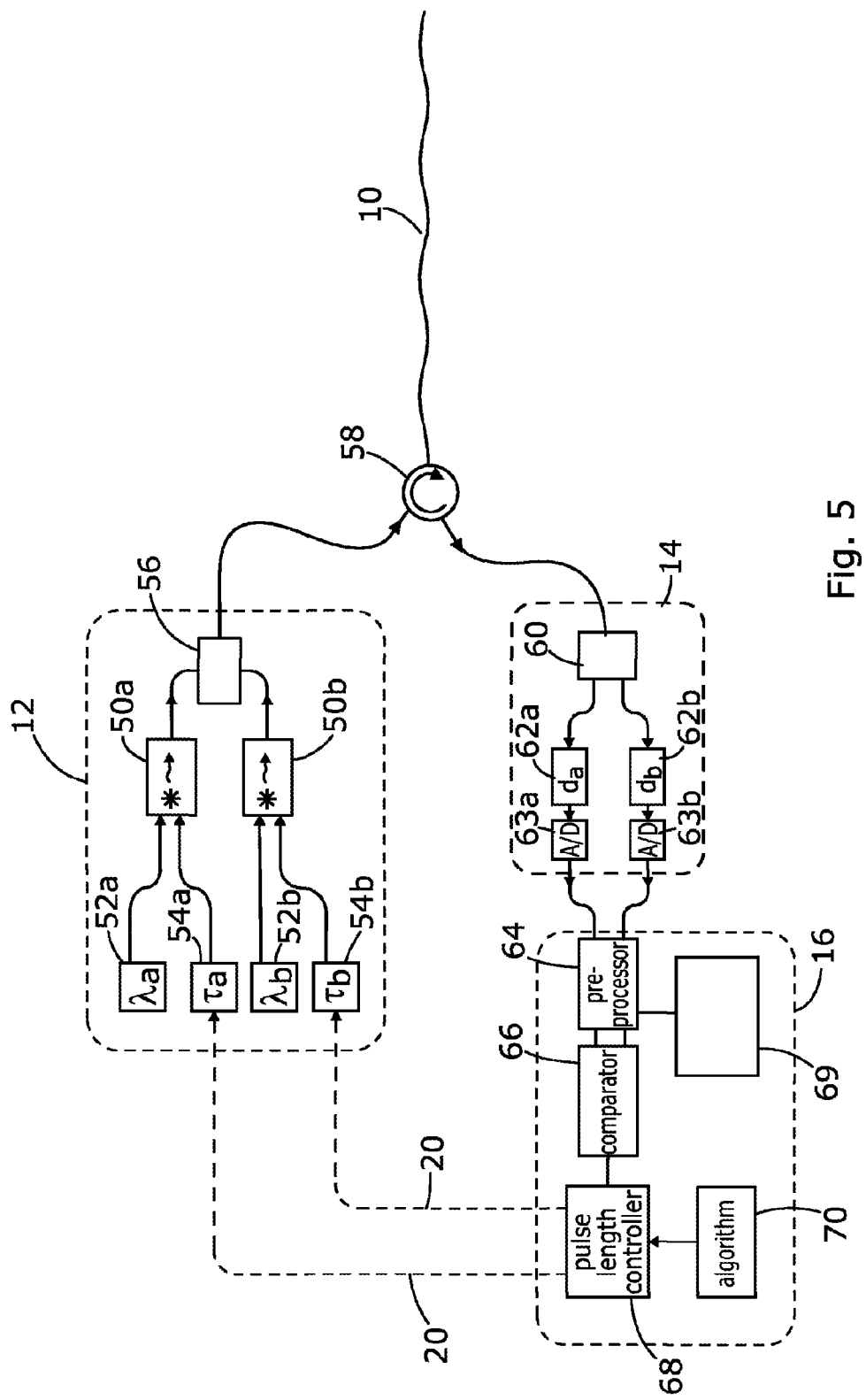
FIG. 5 shows some details of the sensor of FIG. 1 configured to control pulse length and therefore sensor response characteristics.

The described process of detecting non-linearity of response and adjusting probe light pulse length to compensate is illustrated in FIG. 5, which shows selected elements of the sensor of FIG. 1 with further analysis and control features. The probe light source 12 is shown to include two optical sources 50a, 50b operating to generate probe light pulses of wavelength $\lambda_a$ and $\lambda_b$ respectively. Control of probe light wavelength within the probe light source 12 is indicated by pulse wavelength data elements 52a and 52b respectively. Control of probe light pulse length within the probe light source 12 is indicated by pulse length data elements 54a and 54b for the two wavelengths respectively. The generated probe light pulses are conditioned and combined in source optics 56 before being launched into the sensing fibre 10 through optical circulator 58. The probe light pulses are each sufficiently coherent and of narrow bandwidth that the detected backscatter signal is dominated by self interference between different parts of the backscattered pulse, as discussed above in connection with phase-sensitive OTDR.

In this example, the probe light pulses of two (or more) different wavelengths are launched simultaneously, or at least so that the pulses overlap as they travel along the sensing fibre 10. However, a wider pulse spacing could be used, at the risk of degrading the performance of the measure of non-linearity as the pulses of the group increasingly see different states of the sensing fibre 10. For example, a difference in launch time between the pulses of not more than 2 microseconds (so that the two pulses would only see different vibrational signals at very high frequencies beyond the acoustic, around 500 kHz), or not more than about 400 metres in position of the respective pulses along the fibre could be used. In some embodiments, therefore, backscattered light from all of the two (or more) pulses used for the non-linearity detection may be coexistent or present in the sensing fibre at the same time.

In other embodiments, backscattered light from only some pulses in the group coexists within the fibre, and in other embodiments there is no such overlap such that backscatter from the pulses does not overlap at the detector.

Probe light backscattered within the sensing fibre 10 is directed by the circulator 58 to the detector 14 where, following wavelength demultiplexing and signal conditioning in detector optics 60, the backscattered light is detected separately for each wavelength using photodetectors 62a and 62b respectively followed by digitisation at 63a,63b. Signals corresponding to the detected backscattered light for each wavelength are passed to the analyser 16. For some applications, these signals may be pre-processed in pre-processor 64 to form signals which relate more directly to the parameter to be measured and which are therefore more suitable for comparison with each other to derive a measure or indication of non-linearity. For example, for the temporal speckle patterns or coherent Rayleigh noise signals arising from Rayleigh backscatter with sufficiently coherent probe light pulses, successive detected backscatter intensities corresponding to a particular location along the sensing fibre for successive pulses of a particular wavelength may be differenced or otherwise processed to derive a signal indicative of the degree or rate of change of the backscatter signal from that location. This pre-processed signal, which may be more directly related to the vibration or other physical parameter to be measured at that location, or alternatively a signal not processed in this way, is then passed to the comparator 66, where the signals from the two wavelengths are compared. Essentially, the comparator 66 determines and compares, directly or indirectly, properties of the response characteristics for each pulse length. Typical response characteristics which can be derived form the data may include signal amplitude ratios between signals from different interrogation pulses, waveform shapes, and spectral components of vibration signals.

Dependent upon results of that comparison a pulse length controller element 68 in the analyser sends control signals 20 to control the pulse length data elements 54a and 54b in the probe light source according to a pulse length control algorithm 70. The pre-processed signal may also be sent to further processing elements 69, for example to make determinations of the one or more physical parameters to be measured by the sensor.

One way in which the pulse length control algorithm might operate to control the pulse lengths would be to maintain a constant or proportional difference between the two pulse lengths controlled by data elements 54a and 54b, for example a difference of 5 nanoseconds, or a difference of 50%, and to gradually increase the length of both, for example by 1 nanosecond, or by 10%, between short periods of probe light pulses of both wavelengths, where the monitoring periods are chosen to be sufficiently long to cover a number of acoustic or vibration cycles. For example, typical monitoring periods might last for between one and five seconds. If a measure of difference between the data derived from the two backscatter profiles exceeds a certain threshold, then instead of increasing by 1 nanosecond or 10%, both pulse lengths would be decreased, for example by 1 nanosecond or 10%. The measure of difference could be an overall normalised acoustic intensity difference between the two signals at a location of interest, or alternatively, acoustic spectral comparisons could be made. Of course, much more sophisticated and adaptive schemes could be used.

The described technique of linearity control using comparison of properties of the response characteristics, and corresponding pulse length control may be used continuously or intermittently. For example, pulses of different lengths may be used continuously to monitor the non-linearity of the response characteristics and adapt the pulse length very rapidly, for example in response to sudden increases and decreases in an acoustic signal to be detected, in which case the probe light pulses used for detecting non-linearity may also used for detecting the physical parameter to be measured. Alternatively, pulses of different lengths and pulse length compensation may be used on a more intermittent basis, with the sensor operating in other modes in between.

The technique of linearity control using signal comparison and pulse length control may be combined with the technique described above of increasing the interrogation rate of the sensing fibre by using interleaved pulses of different wavelengths. However, the technique of increasing interrogation rate is improved by more even spacing of the pulses of different wavelength, whereas the technique of linearity control is improved by closer spacing of the pulses of different length. The technique of linearity control can, however, be used continuously in such a context by adding a further pulse wavelength for launch at the same time as one of the interleaved pulse wavelengths. Alternatively, these two techniques can be used sequentially for differing periods according to a programmed sequence.

As for the technique of increasing interrogation rate described above, three or more different pulse lengths can also be used for linearity control, for example to more rapidly and accurately determine an optimum pulse length for current use.

A physical parameter to be measured by the sensor such as strain or vibration may vary considerably both in time and in space along the sensing fibre, so that in general it won't be possible to select an optimum pulse length which provides a response characteristic of optimum linearity and sensitivity for all points along the sensing fibre. However, by launching an ensemble of probe light pulses of different pulse lengths it is possible to extend the linear dynamic range of the sensor, whether or not a dynamic control of pulse length as discussed above is also used.

Figure 6:
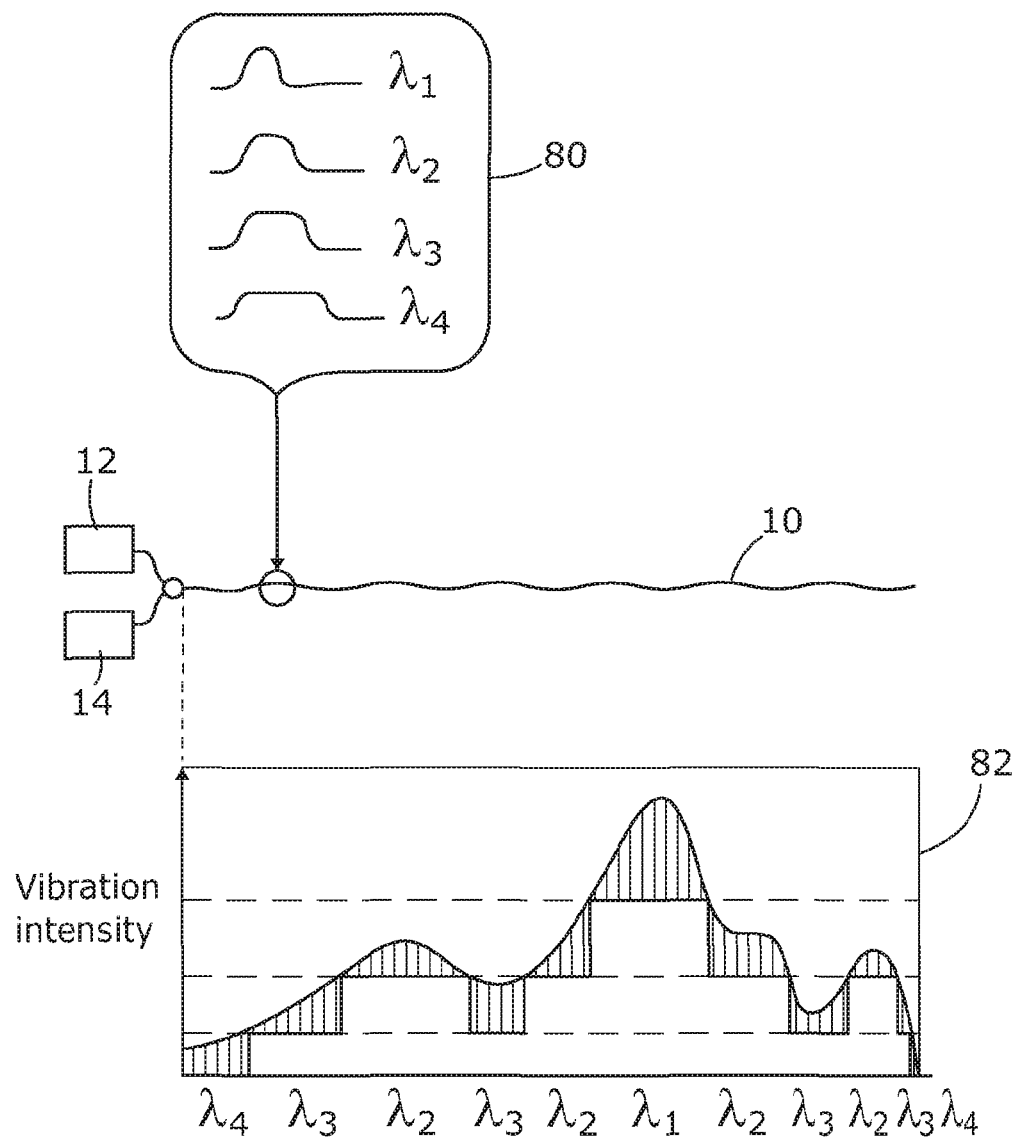
FIG. 6 illustrates use of an ensemble of pulse lengths to increase sensor dynamic range.

FIG. 6 illustrates the sensor of FIG. 1 configured to interrogate the sensing fibre using phase sensitive OTDR as discussed above. In particular, the probe light source 12 is configured to launch a group of four probe light pulses, shown in figure box 80, each of different wavelength $\lambda_1$, $\lambda_2$, $\lambda_3$, $\lambda_4$ into the sensing fibre 10. Each probe light pulse also has a different length, increasing from the shortest length for $\lambda_1$ to the longest length for $\lambda_4$, which together may be referred to as a pulse length ensemble. The longest length pulse provides the most sensitivity to phase imbalances in the sensing fibre, but is therefore also the most susceptible to non-linearity of the response characteristic and is therefore unsuitable for detecting larger phase imbalances which might result from large amplitude strains and vibrations. The shortest length pulse provides the least sensitivity to phase imbalances in the sensing fibre, but is therefore also the least susceptible to non-linearity of response for detecting larger phase bias changes. Suitable durations for such a scheme are 10, 20, 50 and 100 ns for each wavelength respectively. These pulse durations theoretically provide approximate doubling of sensitivity between each successive wavelength and an overall linear dynamic range of ten times that available from the shortest pulse used alone.

Aligned with the sensing fibre 10 in FIG. 6 is a plot 72 of a vibration profile against distance along the fibre. The plot shows levels of vibration divided into four levels. The sensor is adapted to use the detected signal from the $\lambda_4$ pulses, which have the longest duration, in regions of the fibre where the vibration levels are smallest, and the detected signal from the $\lambda_3$, $\lambda_2$ and $\lambda_1$ pulses for regions of the fibre with increasingly high levels of vibration. The selection of which signal to use for which region of the fibre is adaptive so that the best signal for each region is continuously or periodically selected, to maintain an optimum level of sensitivity balanced against avoiding excessive non-linearity in the detected signals. In particular, the sensor may explicitly or implicitly determine properties of the response characteristics of the different pulse durations, and use such properties in the adaptive scheme.

More generally, the sensor may combine data from the four different wavelengths, using weightings which are calculated according to properties of the response characteristics. Of course, the weightings may be binary in the sense of selection of one or more wavelengths to use equally and rejection of the others, or they may include fractional weightings where signals having poor response characteristic properties are given a lower weighting than signals having better response characteristic properties.

The different wavelength and duration pulses of the pulse duration ensemble may be launched into the sensing fibre at the same time, or at least so that they overlap in spatial extent in the fibre, and this better permits cross comparisons between the detected signals of the ensemble to be made. However, in order to use the ensemble for fibre-position selection of pulse duration, simultaneously launching is not required, although it may be advantageous for the pulses to be launched close enough together either so that all pulses of the ensemble exist in the fibre at some point in time, or so that at least some backscatter from all of the pulses of an ensemble coexists within the sensor fibre or reaches the detector at some point in time. In this way, the benefits of improving linearity of response can be maintained without sacrificing the overall interrogation rate.

Figure 7:
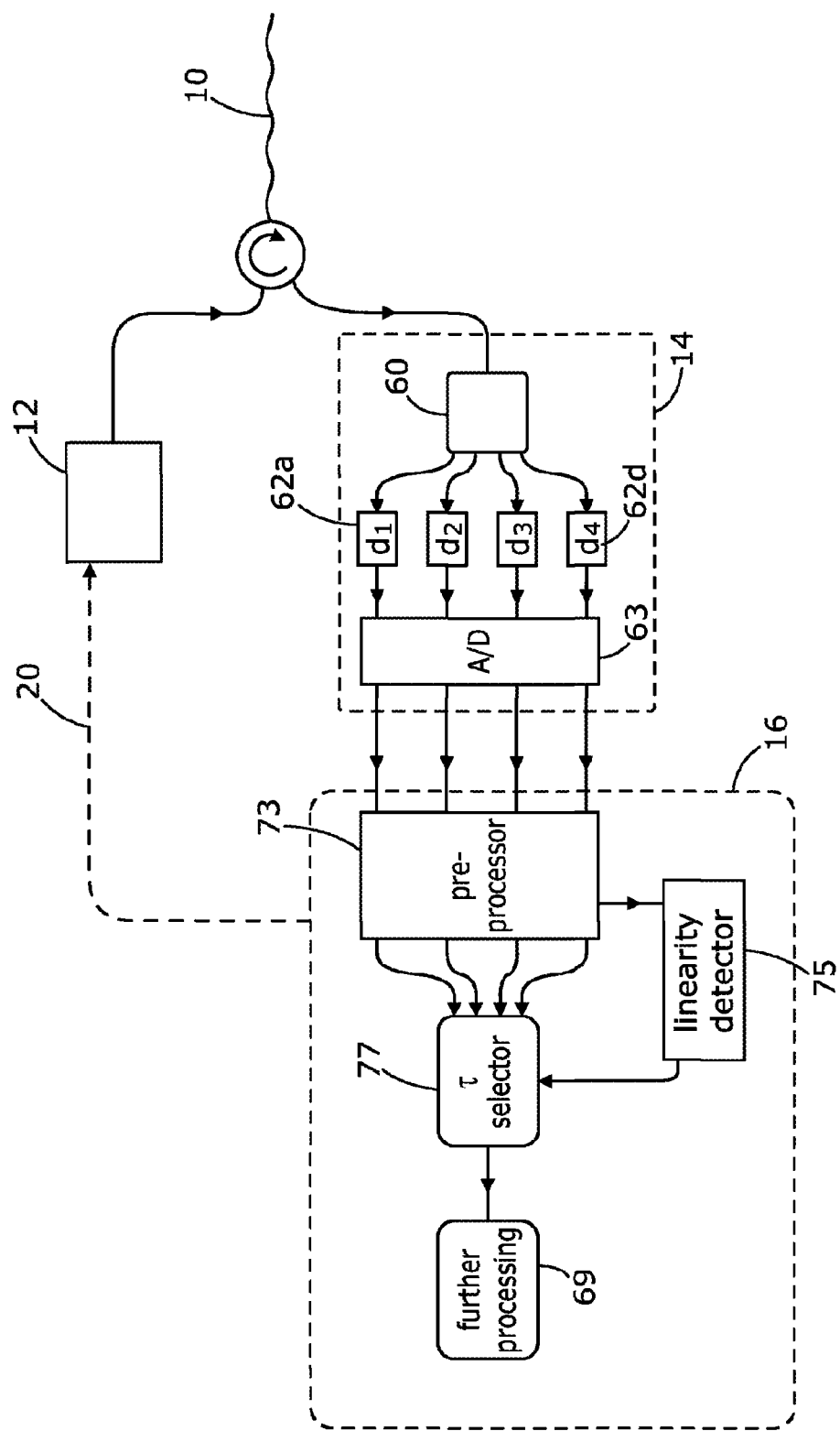
FIG. 7 shows some details of the sensor of FIG. 1 configured to implement the ensemble scheme of FIG. 6.

FIG. 7 illustrates in more detail how the pulse duration ensemble of FIG. 6 can be put into effect in the sensor of FIG. 1, using some common reference numerals also with FIG. 6 to denote like elements. Backscattered light from an ensemble of pulses of four different wavelengths and correspondingly different pulse durations is received in the detector 14 where it is processed and wavelength de-multiplexed by detector optics 60 before being passed to detectors 62a-62d. The detected signals are digitised at A/D converter 63 before being passed to a pre-processor 73 where the signals are processed sufficiently to be able to detect non-linearity more effectively. For example, in the case of vibration induced changes in coherent Rayleigh noise, acoustic spectral profiles may be differenced. Linearity detector 75 monitors the pre-processed signals to determine which wavelength of the ensemble provides the optimum properties of response characteristics, and hence the optimum signal for particular corresponding regions of the sensing fibre, or to determine relative weights for the wavelengths of the ensemble. This selection is passed to an ensemble selector 77 which constructs an assembled signal taking the optimum signals for particular regions of the sensing fibre, or forming a suitably weighted combination of signals. The assembled signal may then be passed to further processing elements 69 as required, for example to make determinations of the one or more physical parameters to be measured.

The linearity detector 75 may work, for example, by selecting the optimum member of the pulse ensemble according to individual spectral characteristics, for example by applying an upper threshold to the permitted incidence of higher acoustic harmonics characteristic of non-linearities of response in the signal for longer pulse durations compared with shorter duration pulses. The power in higher frequency acoustics, for example, may provide a suitable measure or property of the response characteristics for a particular pulse length. Another scheme of operation would be to accept the signal from the longest duration pulses which are of sufficient similarity to any or all shorter duration pulses, the shortest duration pulse being chosen where all pulses of the ensemble provide sufficiently different signals. In this case, the analysis of response characteristics is based on similarity between signals. Another scheme of operation would be to provide fractional weights based on one or more determined properties of the response characteristics.

The pulse duration ensemble technique illustrated in FIGS. 6 and 7 may be combined with the pulse duration control technique described in connection with FIG. 5. In particular, the pulse duration control technique may be used to provide appropriate settings for the pulse ensemble durations. The individual signals from the pulse duration ensemble could also be processed in ways other than a simple selection of an optimum pulse length for a particular region of the sensing fibre at a particular time, for example by using more complex statistical or signal processing to combine the signals from the ensemble to derive an output signal such as a physical parameter to be measured with an optimum signal to noise ratio.

The benefits of the different multi-wavelength, and optionally multi pulse length interrogation techniques described above can be combined in various other ways, both simultaneously and sequentially by choosing an appropriate mix of numbers of interrogation wavelengths and system control parameters. For example, even using only two wavelengths, a vibration sensing system might be set up to first confirm a linear detection regime using the pulse duration control or non-linearity detection techniques, and then be switched into a interrogation rate enhancement mode using interleaved probe light pulses. Alternatively, a three-wavelength system might be configured to offer linearity confirmation and enhanced detection bandwidth at the same time.

For all the techniques described above, it can be beneficial for the phase bias observed in the interference signal of the backscattered probe light for each location along the sensing fibre to be similar across all the probe light pulse optical wavelengths, within a range of $2\pi$. This will not tend to occur unless controlled in some way, because the much larger absolute differences in total phase bias between different wavelengths will tend to give rise to arbitrary differences within the $2\pi$ range. The differences in total phase bias can be many thousands of cycles for pulses with very different lengths in the range of several metres. When phase bias and imbalance, and differences between phase biases and imbalances are discussed herein, differences within the $2\pi$ range are generally meant, unless the context clearly implies absolute values including multiples of $2\pi$.

Figure 8A:
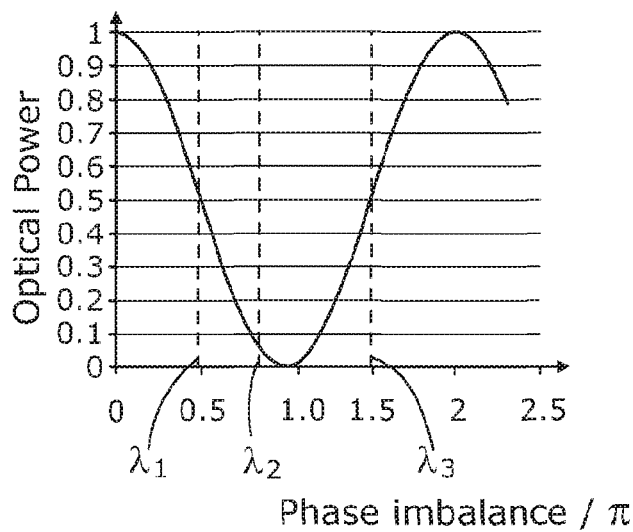
FIGS. 8a to 8c show different arrangements of phase imbalance in an interferometer illustrating how phase bias between interference fringes from pulses of different wavelengths may be controlled and used in a sensor such as that of FIG. 1.

FIG. 8a is similar to FIG. 4a discussed above, but with three vertical dashed lines representing phase biases for the undisturbed sensor fibre, for interference signals detected in backscattered probe light for three different probe light wavelengths at a particular position along a sensing optical fibre 10. In the situation of FIG. 8e, phase imbalance variations about the phase bias for the $\lambda_3$ wavelength at $3\pi/2$ give rise to optical signal changes which are of similar magnitude, but which vary in an opposite sense under changes in phase imbalance to those of the $\lambda_1$ wavelength which has a phase bias at $\pi/2$. The $\lambda_2$ wavelength has a phase bias close to $\pi$, so phase imbalance variations give rise to a different behaviour again in the optical signal, which rises from a low level in both directions.

Figure 8B:
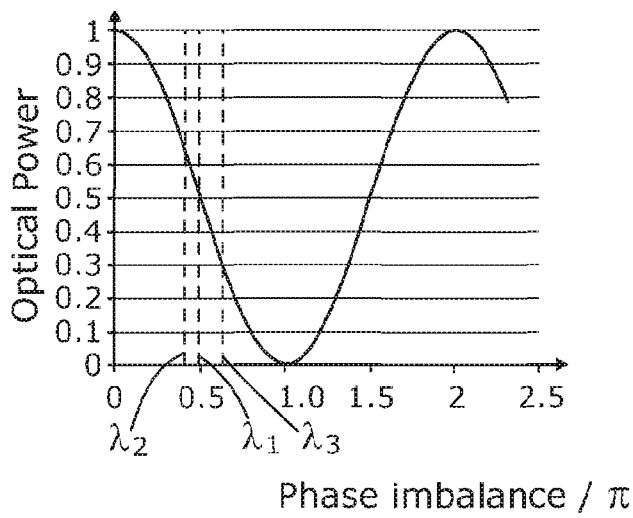

FIG. 8b is similar to FIG. 8a, but the phase biases for wavelengths $\lambda_1$, $\lambda_2$ and $\lambda_3$ are close together within the $2\pi$ range, in this case being commonly aligned at about $\pi/2$ for some arbitrary position along the sensing fibre. The optical signal from all three wavelengths will therefore behave in a similar fashion, subject, for example, to the magnitude of the phase imbalance response to a particular refractive index variation which depends in part on the length of each probe light pulse as discussed above in connection with FIGS. 5, 6 and 7.

Note that although the phase bias in the backscatter interference signal from any given probe light pulse optical wavelength will vary throughout the $2\pi$ range along even short lengths of the sensor optical fibre for example of only a few metres, the respective phase biases of probe light pulses of multiple wavelengths will exhibit an approximately constant phase spacing, as demonstrated below. Therefore, if the phase biases for a group of pulses can be aligned or spaced in a particular way for one position in the sensor fibre, they will be approximately aligned or similarly spaced for all other positions along the sensor fibre.

If the behaviour illustrated in FIG. 8b can be achieved for a group of pulses of different wavelengths, then comparison of sensor data between pulses of different durations as discussed in connection with FIGS. 5-6 can be more easily made, because similar optical response characteristics are expected, subject to pulses exceeding a certain duration tending to result in a more non-linear or distorted optical response. Time series compiled by interleaving data from staggered pulses of different optical wavelengths to increase the sensor sampling rate, as discussed in connection with FIG. 3, can also be improved, because the interleaved data from the two or more pulse wavelengths will be expected to exhibit similar response characteristics to the changes in the sensor fibre. Of course, the effects achieved by controlling the relative phase bias between wavelengths to be small or close to zero can also be achieved by relative phase biases of around $\pi$, with one of the signals being inverted to compensate or equivalent processing being used.

Although control of the phase bias in the interference signal from the backscattered light for each probe pulse wavelength cannot offer uniform phase bias along the length of the sensing fibre, this is not needed to construct a useful sensor system, although it is beneficial to be able to control relative phase bias across the set of probe pulse wavelengths at any location along the fibre so that the response characteristics across all wavelengths are similar at any one position. However, if the sensor is adapted to control relative phase bias between wavelengths, another desirable system feature can be available. With two independent probe light wavelengths, where there is controllable relative phase bias along some or all of the sensor fibre, if the relative phase bias is set to $\pi/2$ radians as in the mathematical example set out below, and the different wavelength pulses are launched sufficiently close together to be affected by substantially the same detectable changes in the sensor fibre, then the variation in response characteristics with position along the sensor fibre can be reduced by processing the data from the different wavelengths according to a vectorial method. This is because, as noted earlier, the output optical intensity of an ideal, two-path interferometer is proportional to one plus the cosine of the instantaneous phase imbalance. Hence, if the relative phase bias for a second probe wavelength compared to the first is $\pi/2$ radians, then the detected optical signal for the second wavelength will be proportional to one plus the sine of the instantaneous phase imbalance. When the zero offset of these two signals is removed and the resulting data values are added in quadrature, for example by being squared and added together, the resulting sum becomes independent of the actual phase bias at that location, thus the variation of the optical response characteristics observed for any one wavelength, or for multiple wavelengths with aligned phase biases, is reduced or eliminated. Taking the square root of the sum provides a linear measure of the amplitude of the disturbances to the phase imbalance.

More generally, if the relative phase bias between two wavelengths is adjusted so that the resulting response characteristics are orthogonal in behaviour or have orthogonal components, then the phase imbalance disturbance responses can be combined to provide a signal with reduced sensitivity to the individual response characteristics of each wavelength.

Using two probe pulse wavelengths with a relative phase bias of around $\pi/2$, absolute signal amplitude information is typically lost beyond phase imbalance disturbances of $\pi$ radians. However, such information can be preserved if a more advanced phase unwrapping algorithm is adopted. In one such method, a third interrogation channel is added, the relative phase bias of each channel is set to $2\pi/3$ radians and the mathematical processing scheme is designed accordingly. Mathematical schemes which could be used in such circumstances are discussed in B. V. Dorrio and J. L. Fernandez, "Phase evaluation methods in whole-field optical measurement techniques", Meas. Sci. Technol., vol 10, pp R33-R55 (1999).

Figure 8C:
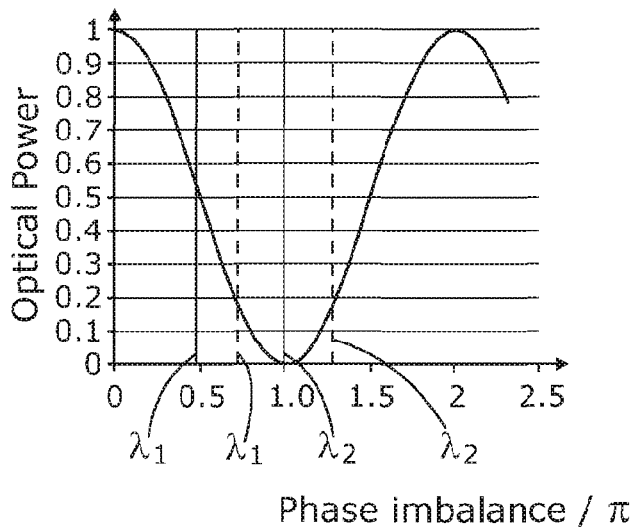

Accordingly, embodiments of the invention provide for misaligning the phase biases of two or more probe light pulse wavelengths by controlled amounts. FIG. 8c illustrates an arrangement of phase bias of multiple probe light wavelengths. The solid vertical lines show phase biases for a first arbitrary position along the sensing fibre at about $\pi/2$ and $\pi$ for wavelengths $\lambda_1$ and $\lambda_2$, with a relative separation of about $\pi/2$. The dashed vertical lines show phase bias for a second arbitrary position along the sensor fibre at about $3\pi/4$ and $5\pi/4$, again with a phase bias separation of about $\pi/2$. As discussed above, for each of these two arbitrary positions along the sensor fibre, and indeed any other arbitrary position where the separation between the phase bias is about $\pi/2$, variations in the optical signal for the two wavelengths caused by disturbances in the phase imbalance can be added vectorially to yield a summed optical response which under ideal circumstances is approximately constant along the sensing fibre. Such a vectorially summed response will generally provide a more consistent response characteristic to changes in the phase imbalance than the signal from any single probe light wavelength taken alone.

Although it would be useful to control the relative phase bias between two probe light pulse wavelengths to be exactly zero, $\pi$, or $\pi/2$ radians as discussed above, some variation about these values is acceptable before the described techniques become ineffective. For example, controlling the relative phase bias of two pulses of different wavelength to within $\pm\pi/4$ or between $3\pi/4$ and $5\pi/4$ radians, or more preferably $\pi/8$ radians or between $7\pi/8$ and $9\pi/8$, where alignment is intended, may give adequate results. Similarly, controlling the relative phase bias of two pulses of different wavelength to between $\pi/4$ and $3\pi/4$ radians or more preferably between $3\pi/8$ and $5\pi/8$ radians, where orthogonality is intended, may give adequate results.

The utility of schemes which control the relative phase bias between different pulse wavelengths can be understood as follows. Consider a sensing system in which the pulse light wavelengths are closely spaced at around 1500 nm, and the effective path imbalance and refractive index of the sensing fibre are about 1 m and 1.5 respectively. The relative phase given by equation (1) above is then about $2\pi \times 10^6$ radians. If the wavelength of a probe light pulse is then changed very slightly to effect a change of $\Delta\phi_{bref}$ in phase of only a few cycles or less, then the fractional change in the absolute phase bias is extremely small. The following expressions give an example where the desired change in phase bias is $\pi/2$ radians. For this case, the required difference between the two probe light pulse wavelengths can be calculated by substituting the two interrogation conditions into equation (1) above to yield:

$$\Delta\phi_{bref} = 2\pi n_e d(1/\lambda_2 - 1/\lambda_1) = \pi/2 \quad (2)$$

The above expression neglects chromatic dispersion in the sensor fibre. The change in wavelength $\Delta\lambda$ needed to produce the required $\pi/2$ phase change is then given by:

$$\Delta\lambda = \lambda_1 \lambda_2 / (4 n_e d) \quad (3)$$

For this example, the required value of $\Delta\lambda$ is approximately 0.37 picometres. Now consider a different part of the sensing fibre where the refractive index is slightly different from $n_e$, due to non-uniformity or some perturbation of the fibre. If the effective refractive index of this alternative section of the fibre is $n_{es}$, then the difference $\Delta\phi_s$ between the phase biases at the two probe light pulse wavelengths is given by an expression similar to the first part of equation (2), with $n_e$ replaced by $n_{es}$. Thus we have:

$$\Delta\phi_s = 2\pi d n_{es} \Delta\lambda/\lambda_1\lambda_2 \quad (4)$$

Substituting in the value of $\Delta\lambda$ from equation (3), we find that the change in wavelength produces a change $\Delta\phi_s$ in phase bias at the sensing section of $$\Delta\phi_s = (\pi/2)(n_{es}/n_e) \quad (5)$$

This expression indicates that, given two probe pulse wavelengths with a relative phase bias of $\pi/2$ in one section of sensor fibre having a refractive index of $n_e$, the relative phase bias in another section having a refractive index of $N_{es}$ is only different by a ratio of the refractive indices. Since the effective refractive index of typical single mode fibres is normally very uniform after manufacture and cannot be changed by more than a very small percentage by typical sensing situations, equation (5) shows that a desired relative phase bias can be adequately maintained between probe light pulses of two or more wavelengths along the whole of the sensing fibre.

An example scheme in which the relative phase bias between two or more probe light pulses of different wavelengths can be regulated or controlled as discussed above is to apply a predetermined oscillatory forcing, for example at an acoustic frequency, to a reference section of the sensor fibre 10. A corresponding oscillatory signal is then detected in the backscattered light in respect of each of the different probe pulse wavelengths for the reference section. These oscillatory signals can then be compared, and the pulse wavelengths adjusted slightly until the detected oscillations at the frequency of the forcing display the desired amplitude difference or other suitable characteristics.

For example, to obtain a relative phase bias of about $\pi/2$ between two pulse wavelengths, the wavelengths may be adjusted until the oscillatory signal at the frequency of the forcing for one probe pulse wavelength is minimised or close to zero, and the corresponding signal for the other wavelength is at a maximum. Similarly, to obtain a relative phase bias of zero, the two wavelengths may be adjusted until the oscillatory signals are both either minimised or zero, or both maximised.

Figure 9:
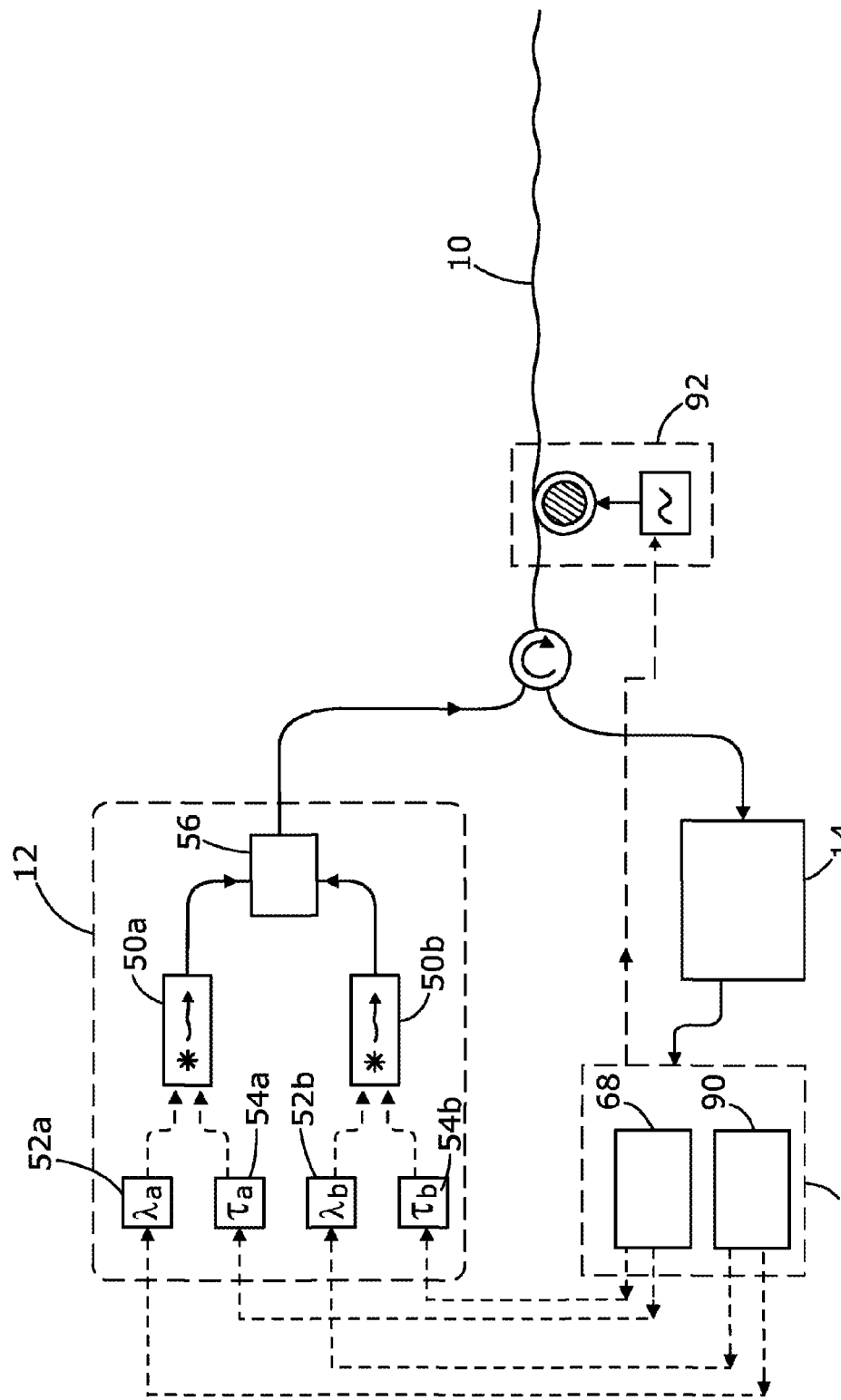
FIG. 9 shows some details of the sensor of FIG. 1 configured to control relative phase bias between interference fringes from pulses of different wavelengths.

An arrangement suitable for putting such schemes into effect is illustrated in FIG. 9. As already shown in FIG. 5, the probe light source 12 comprises at least two laser sources 50a, 50b. The lengths of probe light pulses may be controlled, if desired, in accordance with pulse length data elements 54a, 54b, under the control of pulse length controller element or function 68. The wavelength of probe light pulses is controlled in accordance with pulse wavelength data elements 52e, 52b, under the control of a pulse wavelength controller element or function 90. Either or both of the pulse length controller and pulse wavelength controller elements or functions may be integrated into or combined within the analyser 16, or may be carried out elsewhere.

A relative phase bias calibrator 92 is provided to enable the pulse wavelength controller 90 to detect and adjust phase biases between different wavelengths. In the arrangement illustrated in FIG. 9 the relative phase bias calibrator is arranged to apply an acoustic forcing of predetermined frequency to a length of the sensing fibre, although the forcing could be applied to a parallel length of similar fibre if required, with the similar fibre suitably coupled to the probe light source 12 and detector 14. In an example described in more detail below the forcing is applied by wrapping a suitable length of the sensing fibre 10 around a piezoelectric drum coupled to a driving circuit. The calibrator 92 may be under the control of the analyser 16 if required, for example to turn the forcing signal on and off as needed, or to adjust the acoustic frequency of the forcing.

The pulse wavelength controller element 90 detects, in data derived from the light backscattered from the probe light pulses, the oscillatory signal resulting from the forcing applied by the calibrator, and makes adjustments to the pulse wavelength data elements 52a and 52b to regulate the wavelengths of the probe light pulses so as to achieve the required relative phase bias.

Figure 10:
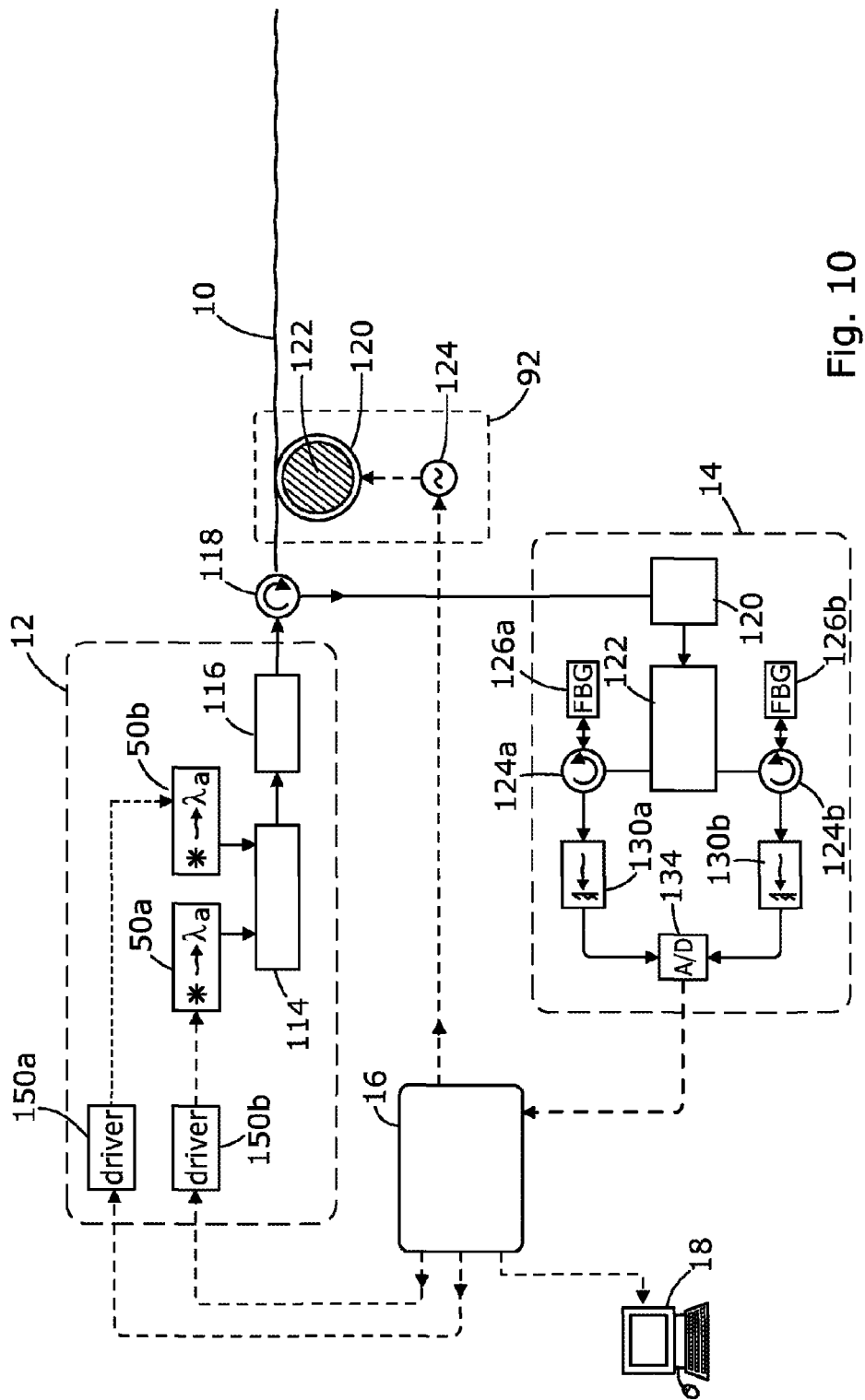
FIG. 10 shows some details of further optical and control components which may be used in implementing a sensor such as that of FIG. 1.

FIG. 10 shows some suitable details of optics and electronics for putting into effect the distributed optical fibre sensor of FIG. 1. The various data processing and control schemes discussed above may be implemented within this framework.

Two separate optical sources 50a and 50b are shown within the probe light source 12, each optical source emitting a narrow band of wavelengths centred at $\lambda_a$ and $\lambda_b$ respectively. It is alternatively possible to use a singe, wavelength switched source, or a combination of sources with switchable and fixed wavelengths. Since two separate optical sources are shown in this embodiment, a wavelength combiner component 114 is required to route the two signal wavelengths onto a common optical path. If a wavelength switched source were to be used alone, then this component would not be required. For convenience of implementation, the wavelengths $\lambda_a$ and $\lambda_b$ used in the system would lie within the operating band of typical erbium-doped fibre amplifiers, between 1528 nm to 1562 nm, and the optical sources would be distributed-feedback laser diodes.

Once combined, the two signal wavelengths are then fed through an optical conditioning chain 116 whose function is to amplify the light to suitable power level and to provide optical filtering to avoid the deleterious effects of amplified spontaneous emission (ASE) from the amplifier elements. Typically, peak powers of the order of 1 W might be delivered to the sensing fibre, and the ASE suppression bandwidth might be ~0.2 nm. Light emerging from the optical conditioning chain is directed to an optical circulator 118 that serves to route probe light from the probe light source 12 into the sensing fibre 10, and light from the sensing fibre 10 into the detector 14.

After the circulator 18, a coil 120 of the sensing fibre 10 wrapped around a strain transducer 122 is used to provide a controllable, repeatable, periodic strain to the fibre, although a length of optical fibre separate to the sensing fibre could instead be used for this purpose. The strain transducer 122 may preferably be a piezoelectric cylinder of radius large enough to avoid bend loss in the fibre coil. This transducer is driven at a convenient acoustic frequency by a driver unit 124. The driver unit 124 may run autonomously or may be controlled from analyser 16. The fibre coil 120 comprises a length of fibre that is at least long enough to contain the maximum pulse length generated by the probe light source 12. In typical systems, this maximum pulse length might be 50 m. The function of the strain transduction system comprising the fibre coil 120, transducer 122 and driver 124 forms the relative phase imbalance calibrator 92 discussed earlier in connection with FIG. 9.

Backscattered light returning from the sensing fibre through the circulator 118 is directed into the detector 14, and in particular into an optical signal conditioning chain 120. This chain contains further amplification and filtering components required to increase the received signal powers to levels suitable for low-noise detection. Following passage through the signal conditioning chain 120, the two signal wavelengths $\lambda_a$ and $\lambda_b$ are separated by the wavelength de-multiplexing component 122. After separation, the two signal wavelengths $\lambda_a$ and $\lambda_b$ are each further filtered to a narrow band using components 124a, 124b and 126 a, 126b respectively. In this embodiment, the narrow band filters are fibre Bragg gratings with approximately 80 pm reflection bandwidth. Finally, each wavelength is received by its own photodetector, 130a and 130b respectively. Conveniently, PIN photodiodes may be used for this purpose.

The signals from each photodetector 130a, 130b are digitized by the data acquisition unit 134 and fed to the analyser 16, which controls the optical sources 110a and 110b via driver circuits 150a and 150b. Apart from providing accurately timed electrical pulses to the optical sources to control probe light pulse timing and length, these driver circuits also serve to fine-tune the wavelength of the optical sources for precise control of relative phase bias between the probe light pulses in a group. This can be achieved, for example, by control of laser temperature. In possible alternative embodiments, fine-tuning of the centre wavelength of different probe light pulses might be accomplished by controlled filtering either before the unconditioned probe light enters the wavelength combiner 114 or after leaving the wavelength demultiplexer 122. In the latter case, the centre wavelength of one or both of the fibre Bragg gratings could be thermally tuned. In another possible embodiment, fine control of wavelength might alternatively be achieved by phase or frequency modulation of light using a radio frequency optical modulator together with appropriate filtering.

Based on analysis of the backscattered probe light, the analyser 16 provides control signals to the driver circuits 150a, 150b to put into effect the various aspects of the invention described elsewhere in this document, including control of probe light pulse length and probe pulse wavelength as required.

Although various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, in arrangements where it is not required to detect backscattered light from at least two wavelengths from a group of pulses simultaneously, for example in variations on the arrangements of FIGS. 5, 7, 9 and 10, a single photodetector may be used, with no separation by wavelength in the signal conditioning chain then being required. Similarly, a single tunable optical source may be used if desired to simplify the sensor where appropriate.

The invention claimed is:

1. A distributed optical fibre sensor for determining at least one physical parameter as a function of position along a sensing fibre from properties of probe light backscattered within the sensing fibre, the sensor comprising:
    a probe light source arranged to launch probe light pulses into the sensing fibre, the probe light pulses including successive groups each of two or more probe light pulses having different optical wavelengths to each other;

a detector arranged to detect probe light backscattered in said sensing fibre, including separately detecting interference signals in the backscattered probe light arising from respective probe light pulses of said different wavelengths; and an analyser arranged to determine said parameter as a function of position along the sensing fibre from the detected interference signals of one or more of said wavelengths, wherein the probe light source is arranged such that the two or more different optical wavelengths of probe light pulses in a group provide one or more predetermined relative phase bias misalignments between the interference signals arising from the different wavelengths.

2. The distributed optical fibre sensor of claim 1 wherein the one or more predetermined relative phase bias misalignments between the interference signals from the different wavelengths correspond to one or more approximately constant phase spacings along the length of the sensing fibre.

3. The distributed optical fibre sensor of claim 2 wherein the one or more predetermined relative phase bias misalignments between the interference signals from the different wavelengths correspond to one or more phase spacings which are constant to within $\pi/4$ along the length of the sensing fibre.

4. The distributed optical fibre sensor of claim 1 wherein the analyser is arranged to determine said parameter as a function of position along the sensing fibre from said detected interference signals of all of said wavelengths.

5. The distributed optical fibre sensor of claim 1 wherein the probe light source is arranged such that the one or more predetermined relative phase bias misalignments between the interference signals in the backscattered light are each within $\pi/4$ radians, or more preferably within $\pi/8$ radians, of zero or $\pi$ radians.

6. The distributed optical fibre sensor of claim 1 wherein the probe light source is arranged such that the one or more predetermined relative phase bias misalignments between the interference signals are within $\pi/4$ radians of $\pi/2$ radians, or more preferably within $\pi/8$ radians of $\pi/2$ radians.

7. The distributed optical fibre sensor of claim 1 wherein the analyser is arranged to vectorially combine data derived from the interference signals of said two or more probe light pulses having different optical wavelengths to each other, and to determine said physical parameter from said vectorially combined data.

8. The distributed optical fibre sensor of claim 1 wherein the probe light source is arranged to adjust said one or more of the plurality of different wavelengths in response to detected interference signals.

9. The distributed optical fibre sensor of claim 8 wherein the detected properties are properties corresponding to a reference section of said sensing fibre.

10. The distributed optical fibre sensor of claim 9 further comprising a relative phase bias calibrator arranged to exert an oscillatory forcing on said reference section of optical fibre into which the probe light pulses are launched, and the sensor is arranged to adjust said one or more of the plurality of different wavelengths using signals derived from the detected backscattered light corresponding to said oscillatory forcing.

11. The distributed optical fibre sensor of claim 1 wherein the probe light source is arranged such that backscattered light from all the pulses of each group coexists within the sensing fibre, and the detector is arranged to separately and simultaneously detect light of each of said different wavelengths.

12. The distributed optical fibre sensor of claim 11 wherein the detector comprises a plurality of photodetector elements, and the sensor is arranged such that each photodetector element detects light of a different one of the probe light pulses in each group.

13. The distributed optical fibre sensor of claim 1 wherein all the probe light pulses of each group coexist within the sensor fibre.

14. The distributed optical fibre sensor of claim 13 wherein all the probe light pulses of each group overlap within the sensor fibre, or are launched by the probe light source at the same time, or are launched within 2 microseconds of each other.

15. The distributed optical fibre sensor of claim 1 wherein the different optical wavelengths of the probe light pulses in a group lie within a wavelength band of 1 nanometer width.

16. The distributed optical fibre sensor of claim 1 wherein the parameter is a measure of vibration.

17. The distributed optical fibre sensor of claim 1 wherein the parameter is indicative of an environmental influence to which the sensor fibre is responsive.

18. The distributed optical fibre sensor of claim 1 where the sensor is arranged such that the interference signals comprise coherent Rayleigh noise at each of said different wavelengths, and the analyser determines said parameter from properties of said coherent Rayleigh noise of one or more of said wavelengths.

19. A method of operating a distributed optical fibre sensor to determine at least one parameter as a function of position along a sensing fibre from properties of probe light backscattered within the sensing fibre, the method comprising:

generating and launching probe light pulses into the sensing fibre, the probe light pulses including successive groups each of two or more probe light pulses having different optical wavelengths to each other;

detecting probe light backscattered in said sensing fibre, including separately detecting interference signals in the backscattered probe light arising from respective probe light pulses of said different wavelengths; and determining said parameter as a function of position along the sensing fibre from said detected interference signals of one or more of said wavelengths, wherein the probe light pulses are generated such that the two or more different wavelengths of probe light pulses in a group provide one or more predetermined relative phase bias misalignments between the interference signals arising from the different wavelengths.

20. The method of claim 19 wherein the one or more predetermined relative phase bias misalignments between the interference signals from the different wavelengths correspond to one or more approximately constant phase spacings along the length of the sensing fibre.

21. The method of claim 20 wherein the one or more predetermined relative phase bias misalignments between the interference signals from the different wavelengths correspond to one or more phase spacings which are constant to within $\pi/4$ along the length of the sensing fibre.

22. The method of claim 19 further comprising determining said parameter as a function of position along the sensing fibre from said detected interference signals of all of said wavelengths.

23. The method of claim 19 wherein said one or more of said plurality of different wavelengths provide one or more predetermined relative phase biases between the interference signals which are within π/4 radians, or more preferably within π/8 radians, of zero or π radians.

24. The method of claim 19 wherein one or more of said plurality of different wavelengths is automatically adjusted to maintain the one or more predetermined relative phase biases between interference signals to be within π/4 radians of π/2 radians, or more preferably within π/8 radians of π/2 radians.

25. The method of claim 19 further comprising combining data derived from the detected interference signals of said two or more probe light pulses vectorially, and determining said physical parameter from said combined data.

26. The method of claim 19 further comprising adjusting said one or more of the plurality of different wavelengths in response to said detected interference signals.

27. The method of claim 26 wherein the detected properties are properties corresponding to a reference section of said sensing fibre.

28. The method of claim 27 further comprising using a relative phase bias calibrator to exert an oscillatory forcing on said reference section of optical fibre into which the probe light pulses are launched, and adjusting said one or more of the plurality of different wavelengths using signals derived from the detected backscattered light corresponding to said oscillatory forcing.

29. The method of claim 19 wherein the probe light pulses are generated and launched such that backscattered light from all the pulses of each group coexists within the sensing fibre, and the detection is carried out by a detector arranged to separately and simultaneously detect light of each of said different wavelengths.

30. The method of claim 29 wherein the detector comprises a plurality of photodetector elements, and the method comprises each photodetector element detecting light of a different one of the probe light pulses in each group.

31. The method of claim 19 wherein all the probe light pulses of each group coexist within the sensor fibre.

32. The method of claim 31 wherein all the probe light pulses of each group overlap within the sensor fibre, or are launched into the sensing fibre at the same time, or are launched into the sensing fibre within 2 microseconds of each other.

33. The method of claim 19 wherein the different optical wavelengths of the probe light pulses in a group lie within a wavelength band of 1 nanometer width.

34. The method of claim 19 wherein the parameter is a measure of vibration.

35. The method of claim 19 wherein the detected interference signals are coherent Rayleigh noise at each of said different wavelengths, and the parameter is determined from properties of said coherent Rayleigh noise of one or more of said wavelengths.

* * * * *